United States Patent
Jia et al.

(10) Patent No.: US 11,316,591 B2
(45) Date of Patent: Apr. 26, 2022

(54) FREQUENCY OFFSET PROCESSING METHOD, APPARATUS, AND DEVICE AND STORAGE MEDIUM

(71) Applicant: Huawei Technologies Co., Ltd., Shenzhen (CN)

(72) Inventors: Wei Jia, Shenzhen (CN); Chao Pan, Dongguan (CN); Han Zhao, Dongguan (CN); Ning Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/150,661

(22) Filed: Jan. 15, 2021

(65) Prior Publication Data
US 2021/0135763 A1 May 6, 2021

Related U.S. Application Data

(63) Continuation of application No. PCT/CN2019/078070, filed on Mar. 14, 2019.

(30) Foreign Application Priority Data

Jul. 16, 2018 (CN) .......................... 201810775162.0

(51) Int. Cl.
*H04B 10/572* (2013.01)
*H04B 10/077* (2013.01)
(Continued)

(52) U.S. Cl.
CPC ....... *H04B 10/572* (2013.01); *H04B 10/0775* (2013.01); *H04B 10/07955* (2013.01);
(Continued)

(58) Field of Classification Search
CPC .......... H04B 10/0775; H04B 10/07955; H04B 10/07957; H04B 10/506; H04B 10/548;
(Continued)

(56) References Cited

U.S. PATENT DOCUMENTS

| | | | | |
|---|---|---|---|---|
| 7,440,648 | B2 * | 10/2008 | Oikawa | H04Q 11/0005 385/16 |
| 9,235,006 | B2 * | 1/2016 | Frisken | G02B 6/29313 |

(Continued)

FOREIGN PATENT DOCUMENTS

| | | |
|---|---|---|
| CN | 102879864 A | 1/2013 |
| CN | 104620155 A | 5/2015 |

(Continued)

OTHER PUBLICATIONS

Sorimoto et al.; Compact and phase-error-robust multilayered AWG-based wavelength selective switch driven by a single LCOS; Jul. 2013; Optical of America; pp. 1-19. (Year: 2019).*

Primary Examiner — Amritbir K Sandhu
(74) Attorney, Agent, or Firm — Conley Rose, P.C.

(57) ABSTRACT

A frequency offset processing method, apparatus, and a storage medium, where the method includes: determining a frequency offset of a preset channel in a wavelength selective switch (WSS); determining a correspondence between a frequency offset and a wavelength or a correspondence between a frequency offset and a pixel position based on the frequency offset of the preset channel; and determining a frequency offset of a traffic channel according to the determined correspondence.

20 Claims, 13 Drawing Sheets

(51) Int. Cl.
*H04B 10/079* (2013.01)
*H04B 10/50* (2013.01)
*H04B 10/548* (2013.01)

(52) U.S. Cl.
CPC ..... *H04B 10/07957* (2013.01); *H04B 10/506* (2013.01); *H04B 10/548* (2013.01)

(58) Field of Classification Search
CPC ............. H04B 10/572; H04Q 11/0005; H04Q 2011/0026; H04Q 2011/0049
USPC ........................................................... 398/48
See application file for complete search history.

(56) References Cited

U.S. PATENT DOCUMENTS

| | | | |
|---|---|---|---|
| 9,274,284 B2 | 3/2016 | Komiya | |
| 2012/0328291 A1* | 12/2012 | Frisken | G02B 6/3588 |
| | | | 398/48 |
| 2014/0348464 A1* | 11/2014 | Kamura | H04J 14/0212 |
| | | | 385/16 |
| 2015/0208144 A1 | 7/2015 | Holmes | |
| 2016/0165324 A1* | 6/2016 | Zhao | G02B 6/2938 |
| | | | 398/48 |
| 2016/0211912 A1* | 7/2016 | Liu | H04B 10/07957 |
| 2016/0323034 A1* | 11/2016 | Wagener | H04J 14/0212 |
| 2017/0075075 A1* | 3/2017 | Frisken | G02B 6/3512 |
| 2018/0128984 A1* | 5/2018 | Yan | G02B 6/293 |
| 2018/0138980 A1 | 5/2018 | Jiang et al. | |
| 2018/0152259 A1* | 5/2018 | Liu | H04B 10/073 |
| 2019/0199464 A1* | 6/2019 | Zong | G02B 6/3588 |
| 2021/0149118 A1* | 5/2021 | Xiang | H04Q 11/0005 |

FOREIGN PATENT DOCUMENTS

| | | | |
|---|---|---|---|
| CN | 105827319 A | | 8/2016 |
| CN | 107872411 A | | 4/2018 |
| CN | 108121036 A | | 6/2018 |
| CN | 110557218 A | * | 12/2019 |
| CN | 110557218 B | | 3/2021 |
| WO | 2015134393 A1 | | 9/2015 |

* cited by examiner

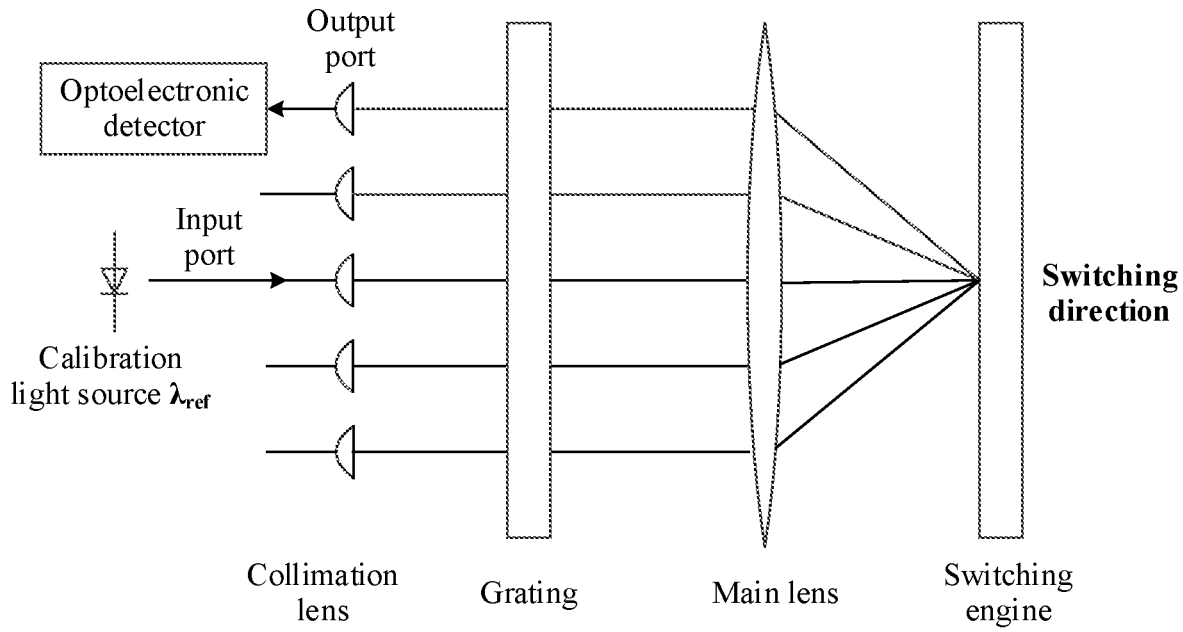

FIG. 5

```
┌─────────────────────────────────────────────────────────────┐
│ Determine a frequency offset of a preset channel in a WSS,  │
│ where the preset channel includes at least two channels     │──⌇ S601
│ other than a traffic channel among the plurality of         │
│ channels of the WSS                                         │
└─────────────────────────────────────────────────────────────┘
                              ↓
┌─────────────────────────────────────────────────────────────┐
│ Determine a correspondence between a frequency offset and a │
│ wavelength or a correspondence between a frequency offset   │──⌇ S602
│ and a pixel position based on the frequency offset of the   │
│ preset channel                                              │
└─────────────────────────────────────────────────────────────┘
                              ↓
┌─────────────────────────────────────────────────────────────┐
│ Determine a frequency offset of the traffic channel         │
│ according to the correspondence between a frequency offset  │──⌇ S603
│ and a wavelength or the correspondence between a frequency  │
│ offset and a pixel position                                 │
└─────────────────────────────────────────────────────────────┘
```

FIG. 6

FREQUENCY OFFSET PROCESSING METHOD, APPARATUS, AND DEVICE AND STORAGE MEDIUM

CROSS-REFERENCE TO RELATED APPLICATIONS

This application is a continuation of International Patent Application No. PCT/CN2019/078070, filed on Mar. 14, 2019, which claims priority to Chinese Patent Application No. 201810775162.0, filed on Jul. 16, 2018. The disclosures of the aforementioned applications are hereby incorporated by reference in their entireties.

TECHNICAL FIELD

Embodiments of this application relate to optical communications technologies, and in particular, to a frequency offset processing method, apparatus, and device and a storage medium.

BACKGROUND

To improve transmission efficiency of a signal in a high-speed optical transmission system, the signal may be adjusted in a constellation shaping manner or a faster-than-Nyquist coding manner, such that a baud rate of the signal is substantially improved, and a frequency width of the signal is also close to a channel bandwidth. In the optical transmission system, a signal usually needs to be added and/or dropped, for example, to be sent and/or received, by a reconfigurable optical add/drop multiplexer (ROADM) that includes wavelength selective switches (WSS) at a plurality of levels.

A center wavelength of a channel in a WSS shifts due to factors such as temperature, atmospheric pressure, mechanical vibration, and aging. A frequency offset causes asymmetric filtering on a transmitted signal, and results in signal quality deterioration. In a case of multi-level WSS cascading, an impact of the frequency offset is more severe, resulting in a significant reduction in an overall filtering bandwidth of a channel.

In a current network, a frequency offset of a center wavelength of each channel in a WSS cannot be detected precisely, easily resulting in service impairment or even interruption.

SUMMARY

Embodiments of this application provide a frequency offset processing method, apparatus, and device and a storage medium, in order to accurately detect a frequency offset of a WSS, improve signal transmission quality, avoid service impairment and interruption, and ensure normal service operation.

According to a first aspect, the embodiments of this application provide a frequency offset processing method. The method is applied to a wavelength selective switch (WSS) that includes a switching engine and has a plurality of channels, where each channel includes at least one pixel column of the switching engine. The method includes: determining a frequency offset of a preset channel in the WSS, where the preset channel includes at least two channels other than a traffic channel among the plurality of channels; determining a correspondence between a frequency offset and a wavelength or a correspondence between a frequency offset and a pixel position based on the frequency offset of the preset channel; and determining a frequency offset of the traffic channel according to the correspondence between a frequency offset and a wavelength or the correspondence between a frequency offset and a pixel position.

In a possible implementation, the preset channel is used for frequency offset monitoring, and is distributed on two sides of the traffic channel. Additionally, a pixel column included in the preset channel is located in an edge position in the switching engine.

In another possible implementation, the frequency offset of the preset channel includes detected frequency offsets of a plurality of subchannels in the preset channel, and each subchannel includes at least one pixel column.

In still another possible implementation, the determining a frequency offset of a preset channel in the WSS includes: determining a detected wavelength of each subchannel in the preset channel; determining a calibration wavelength of each subchannel in the preset channel according to a preset correspondence between a subchannel and a wavelength; and determining a detected frequency offset of each subchannel based on the detected wavelength of each subchannel and the calibration wavelength of each subchannel.

In yet another possible implementation, the detected wavelength of each subchannel is a center wavelength, the switching engine is a liquid crystal on silicon (LCOS) chip, and the determining a detected wavelength of each subchannel in the preset channel includes: adjusting phase information of each subchannel, such that a signal reflected by each subchannel is output to an output port of the WSS in a time division manner; adjusting a center wavelength of a calibration light entering each subchannel; detecting a maximum optical power of the output port of the WSS; and determining a center wavelength of each subchannel based on the maximum optical power.

In yet another possible implementation, the detected wavelength of each subchannel is an edge wavelength, the switching engine is an LCOS chip, and the determining a detected wavelength of each subchannel in the preset channel includes: adjusting phase information of each subchannel, such that a signal reflected by each subchannel is output to an output port of the WSS in a time division manner; adjusting a center wavelength of a calibration light source entering each subchannel; detecting a power of the output port of the WSS, to generate a filter spectrum of each subchannel; and comparing the filter spectrum of each subchannel with a filter spectrum of an adjacent subchannel, and determining a wavelength with a same insertion loss or a wavelength at an intersection of the filter spectra as an edge wavelength of each subchannel.

In yet another possible implementation, the detected wavelength of each subchannel is a center wavelength, the switching engine is a micro-electro-mechanical system (MEMS) chip, and the determining a detected wavelength of each subchannel in the preset channel includes: adjusting a signal transmission direction corresponding to each subchannel, such that a signal reflected by each subchannel is output to an output port of the WSS in a time division manner; adjusting a center wavelength of a calibration light source entering each subchannel; detecting a maximum optical power of the output port of the WSS; and determining a center wavelength of each subchannel based on the maximum optical power.

In yet another possible implementation, the detected wavelength of each subchannel is an edge wavelength, the switching engine is an MEMS chip, and the determining a detected wavelength of each subchannel in the preset channel includes: adjusting a signal transmission direction corresponding to each subchannel, such that a signal reflected by each subchannel is output to an output port of the WSS in a time division manner; adjusting a center wavelength of a calibration light source entering each subchannel; detecting a power of the output port of the WSS, to generate a filter spectrum of each subchannel; comparing the filter spectrum of each subchannel with a filter spectrum of an adjacent subchannel; and determining a wavelength with a same insertion loss or a wavelength at an intersection of the filter spectra as an edge wavelength of each subchannel.

In yet another possible implementation, the determining a correspondence between a frequency offset and a wavelength or a correspondence between a frequency offset and a pixel position based on the frequency offset of the preset channel includes: obtaining a fitted frequency offset of each subchannel based on the calibration wavelength of each subchannel or a pixel position of each subchannel, a preset frequency offset fitting formula, and at least one preset group of fitting coefficients, where each group of fitting coefficients includes a group of fitting coefficients of polynomials in the frequency offset fitting formula; calculating a sum of squared errors between the fitted frequency offset of each subchannel and the detected frequency offset of each subchannel; adjusting the fitting coefficients of the polynomials in the frequency offset fitting formula, until it is determined that a minimum sum of squared errors between a detected frequency offset of the at least one subchannel and a fitted frequency offset of the at least one subchannel is reached; determining optimal fitting coefficients of the polynomials in the frequency offset fitting formula based on the minimum sum of squared errors; and determining the correspondence between a frequency offset and a wavelength or the correspondence between a frequency offset and a pixel position based on the optimal fitting coefficients.

In the method, the correspondence between a frequency offset and a wavelength or the correspondence between a frequency offset and a pixel position is determined based on the optimal fitting coefficients of the polynomials in the frequency offset fitting formula. In this way, an optimal correspondence between a frequency offset and a wavelength or an optimal correspondence between a frequency offset and a pixel position can be obtained. The frequency offset of the traffic channel obtained according to the optimal correspondence between a frequency offset and a wavelength or the optimal correspondence between a frequency offset and a pixel position is more accurate, thereby implementing accurate frequency offset detection.

In yet another possible implementation, the determining a correspondence between a frequency offset and a wavelength or a correspondence between a frequency offset and a pixel position based on the frequency offset of the preset channel includes: determining a frequency offset expression of each subchannel based on the detected frequency offset of each subchannel, and the calibration wavelength of each subchannel or a pixel position of each subchannel; solving equations of a frequency offset expression of at least one subchannel in the preset channel, to obtain fitting coefficients of polynomials in a frequency offset fitting formula; and determining the correspondence between a frequency offset and a wavelength or the correspondence between a frequency offset and a pixel position based on the fitting coefficients.

In the method, the fitting coefficients of the polynomials in the frequency offset fitting formula may be obtained by solving equations, such that the coefficients that are of the polynomials and that are obtained through fitting are more accurate, and the frequency offset fitting formula can more accurately ensure the correspondence between a frequency offset and a wavelength or the correspondence between a frequency offset and a pixel position in the WSS, thereby implementing more accurate frequency offset detection. Then, frequency offset calibration is performed, thereby improving transmission quality of each channel, avoiding service impairment and interruption, and ensuring normal service operation.

In yet another possible implementation, the method further includes: calibrating the traffic channel based on the frequency offset of the traffic channel.

According to a second aspect, the embodiments of this application may further provide a frequency offset processing apparatus. The frequency offset processing apparatus is applied to a wavelength selective switch (WSS) that includes a switching engine and has a plurality of channels, where each channel includes at least one pixel column of the switching engine. Additionally, the frequency offset processing apparatus includes: a processing module configured to: determine a frequency offset of a preset channel in the WSS, where the preset channel includes at least two channels other than a traffic channel among the plurality of channels; determine a correspondence between a frequency offset and a wavelength or a correspondence between a frequency offset and a pixel position based on the frequency offset of the preset channel; and determine a frequency offset of the traffic channel according to the correspondence between a frequency offset and a wavelength or the correspondence between a frequency offset and a pixel position.

In a possible implementation, the frequency offset of the preset channel includes detected frequency offsets of a plurality of subchannels in the preset channel, and each subchannel includes at least one pixel column.

In another possible implementation, the processing module is configured to: determine a detected wavelength of each subchannel in the preset channel; determine a calibration wavelength of each subchannel in the preset channel according to a preset correspondence between a subchannel and a wavelength; and determine a detected frequency offset of each subchannel based on the detected wavelength of each subchannel and the calibration wavelength of each subchannel.

In still another possible implementation, the detected wavelength of each subchannel is a center wavelength, and the switching engine is a liquid crystal on silicon (LCOS) chip. Additionally, the processing module is configured to: adjust phase information of each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and the switching engine is an LCOS chip. Additionally, the processing module is configured to: adjust phase information of each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the detected wavelength of each subchannel is a center wavelength, and the switching engine is an MEMS chip. Additionally, the processing module is configured to: adjust a signal transmission direction corresponding to each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and the switching engine is an MEMS chip. Additionally, the processing module is configured to: adjust a signal transmission direction corresponding to each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the processing module is configured to: obtain a fitted frequency offset of each subchannel based on the calibration wavelength of each subchannel or a pixel position of each subchannel, a preset frequency offset fitting formula, and at least one preset group of fitting coefficients, where each group of fitting coefficients includes a group of fitting coefficients of polynomials in the frequency offset fitting formula; calculate a sum of squared errors between the fitted frequency offset of each subchannel and the detected frequency offset of each subchannel; adjust the fitting coefficients of the polynomials in the frequency offset fitting formula, until it is determined that a minimum sum of squared errors between a detected frequency offset of the at least one subchannel and a fitted frequency offset of the at least one subchannel is reached; determine optimal fitting coefficients of the polynomials in the frequency offset fitting formula based on the minimum sum of squared errors; and determine the correspondence between a frequency offset and a wavelength or the correspondence between a frequency offset and a pixel position based on the optimal fitting coefficients.

In yet another possible implementation, the processing module is configured to: determine a frequency offset expression of each subchannel based on the detected frequency offset of each subchannel, and the calibration wavelength of each subchannel or a pixel position of each subchannel; solve equations of a frequency offset expression of at least one subchannel in the preset channel, to obtain fitting coefficients of polynomials in a frequency offset fitting formula; and determine the correspondence between a frequency offset and a wavelength or the correspondence between a frequency offset and a pixel position based on the fitting coefficients.

According to a third aspect, the embodiments of this application may further provide a frequency offset processing device, including a processor, where the processor is coupled to a memory. The memory is configured to store a computer program, where the processor is configured to execute the computer program stored in the memory, such that the frequency offset processing device performs the frequency offset processing method according to the first aspect.

According to a fourth aspect, the embodiments of this application may further provide a readable storage medium, including a program or an instruction. When the program or the instruction runs on a computer, the frequency offset processing method according to the first aspect is performed.

According to the frequency offset processing method, apparatus, and device and the storage medium that are provided in the embodiments of this application, the frequency offset of the preset channel in the WSS may be determined, where the preset channel includes at least two channels other than the traffic channel among the plurality of channels. The correspondence between a frequency offset and a wavelength or the correspondence between a frequency offset and a pixel position may be determined based on the frequency offset of the preset channel. Then, the frequency offset of the traffic channel may be determined according to the correspondence between a frequency offset and a wavelength or the correspondence between a frequency offset and a pixel position. According to the method, a frequency offset of each traffic channel in the WSS can be detected accurately, and then, frequency offset calibration can be performed, thereby improving transmission quality of the traffic channel, avoiding service impairment and interruption, and ensuring normal service operation.

BRIEF DESCRIPTION OF DRAWINGS

FIG. 5 is a schematic structural diagram 2 of a WSS in a dispersion direction according to an embodiment of this application;

FIG. 6 is a flowchart 1 of a frequency offset processing method according to an embodiment of this application;

DESCRIPTION OF EMBODIMENTS

Technical solutions in the following embodiments of this application may be applicable to an optical transmission system, for example, a 200 G or 400 G long-distance high-speed optical transmission system. Certainly, the technical solutions may also be applicable to another optical transmission system.

All aspects, embodiments, or features are presented in this application by describing a system that may include multiple devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific, but not limiting manner.

In the embodiments of this application, "information", "signal", "message", and "channel" may all be used sometimes. It should be noted that expressed meanings are consistent when differences are not emphasized; and "of", "corresponding", and "corresponding" may all be used sometimes. It should be noted that expressed meanings are consistent when differences are not emphasized.

In the embodiments of this application, a subscript such as in W1 may be mistakenly written in a non-subscript form such as in W1 sometimes, and expressed meanings are consistent when differences are not emphasized.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
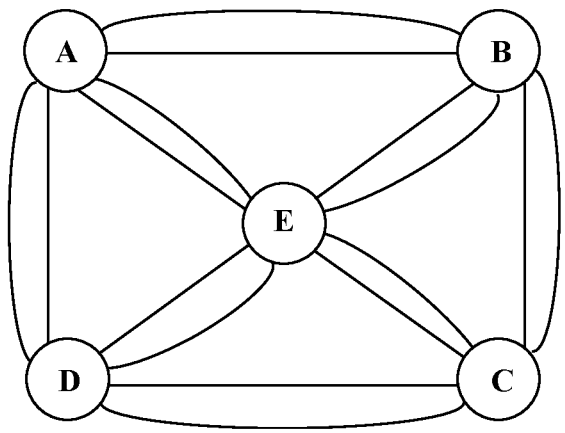
FIG. 1 is a schematic diagram of an optical transmission system to which a frequency offset processing method is applied according to an embodiment of this application.
Figure 2:
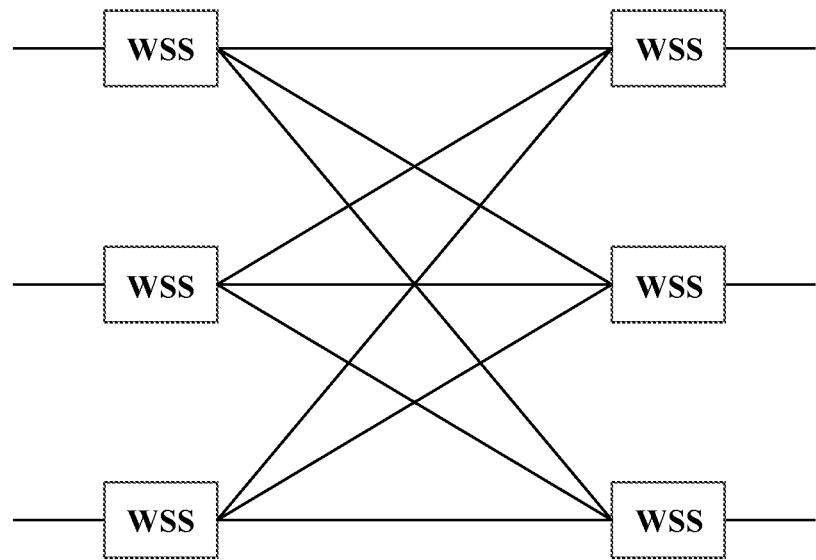
FIG. 2 is a schematic diagram of an ROADM in an optical transmission system to which a frequency offset processing method is applied according to an embodiment of this application.

For ease of understanding of the embodiments of this application, an optical transmission system shown in FIG. 1 is used as an example to first describe in detail an optical transmission system to which the embodiments of this application are applicable. FIG. 1 is a schematic diagram of an optical transmission system to which a frequency offset processing method is applied according to an embodiment of this application. FIG. 2 is a schematic diagram of an ROADM in an optical transmission system to which a frequency offset processing method is applied according to an embodiment of this application. As shown in FIG. 1, the optical transmission system may be applied to a range including a plurality of nodes. Each node may include an ROADM. The plurality of nodes may include, for example, A, B, C, D, and E shown in FIG. 1. Each node may be located at a site, and nodes at different sites are connected to each other. As shown in FIG. 2, each ROADM may include WSSs that are at a plurality of levels, and the WSSs that are at a plurality of levels are connected to each other.

Figure 3:
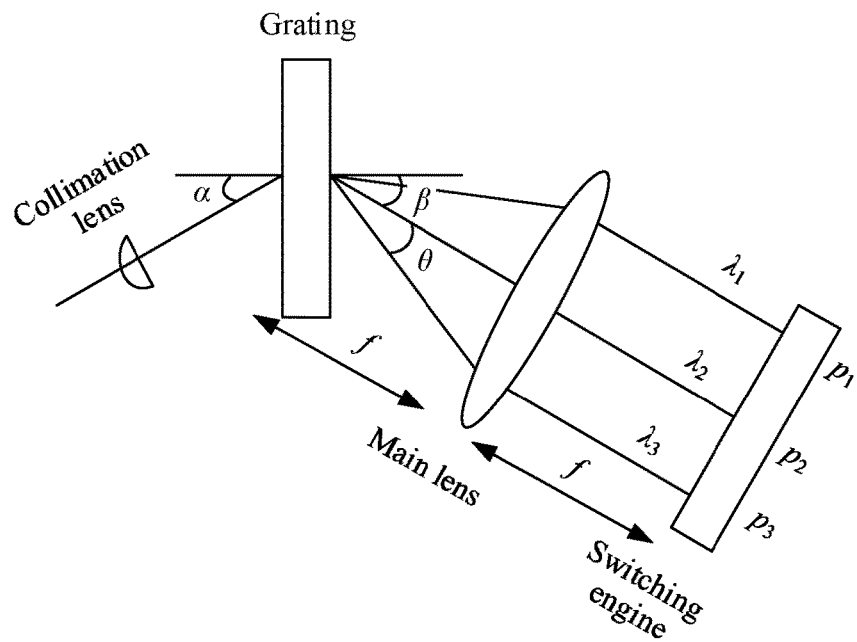
FIG. 3 is a schematic structural diagram 1 of a WSS in a dispersion direction according to an embodiment of this application.

A frequency offset processing method provided in the following embodiments of this application may be applied to any WSS on any node in an optical transmission system. FIG. 3 is a schematic structural diagram 1 of a WSS in a dispersion direction according to an embodiment of this application. As shown in FIG. 3, the WSS may include a collimation lens, a grating, a main lens, and a switching engine. The switching engine may be a liquid crystal on silicon (LCOS) chip or a micro-electro-mechanical system (MEMS) chip.

An optical signal including a plurality of wavelengths is collimated by the collimation lens and focused to a surface of the grating. An angle at which an optical signal is incident to the grating is α. For simplification, a lens that is between the collimation lens and the grating and that transforms a shape of a light spot is not shown. The grating diffracts the optical signal including different wavelengths to different propagation directions. An angle at which an optical signal is emergent from the grating is β, and angular dispersion θ is generated. $\lambda_2$ is a wavelength in the middle of an entire optical spectrum, and $\lambda_1$ and $\lambda_3$ are wavelengths on two sides of the entire optical spectrum. Optical signals of the wavelengths are focused to a surface of the switching engine by the main lens, and the angular dispersion θ is converted into displacement dispersion, such that the optical signals of the different wavelengths are focused to different positions p on the switching engine. A focal length of the main lens is f. The angle at which an optical signal is incident to the grating and the angle at which an optical signal is emergent from the grating meet a formula (1):

$$m\lambda = nd(\sin(\alpha) + \sin(\beta)) \quad \text{formula (1)},$$

where m is a diffraction order of the grating, n is a refractive index of a propagation medium that includes the grating to which an optical signal is incident and from which an optical signal is emergent, and d is a scale period spacing of the grating.

A relationship between a wavelength of an optical signal and a frequency of the optical signal meets a formula (2):

$$\lambda = c/v \quad \text{formula (2)},$$

where c is a light propagation speed, and v is the frequency of the optical signal.

A relationship between a position of an optical signal of each wavelength on a switching engine and the angular dispersion meets a formula (3):

$$p = f \tan(\theta) \quad \text{formula (3)}$$

Factors such as temperature, atmospheric pressure, and component aging cause a slight change to parameters such as the scale period spacing of the grating in the WSS, the focal length of the main lens in the WSS, and a location of an optical component in the WSS. Changes to these parameters result in an offset $\Delta p$ of a position of a signal of each wavelength on the switching engine, consequently causing a frequency offset $\Delta v$ in each channel in the WSS. A relationship between a position offset of a channel and a frequency offset of the channel meets a formula (4):

$$\Delta p = \frac{dp}{dv} \Delta v \quad \text{formula (4)}$$

Figure 4:
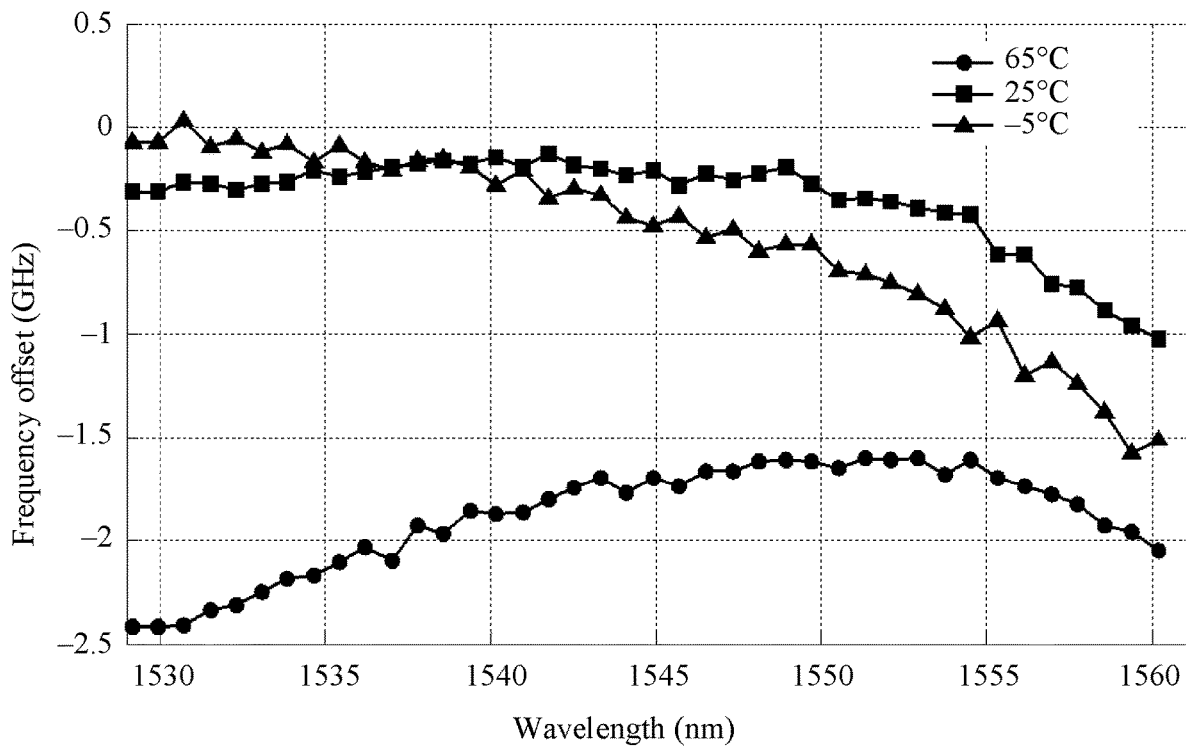
FIG. 4 is a schematic diagram of frequency offsets corresponding to wavelengths of a WSS at different temperatures according to an embodiment of this application.

FIG. 4 is a schematic diagram of frequency offsets corresponding to wavelengths of a WSS at different temperatures according to an embodiment of this application. FIG. 4 shows correspondences between wavelengths in a C-band of the WSS and frequency offsets at three different temperatures, for example, −5° C., 25° C., and 65° C. It can be learned from FIG. 4 that different wavelengths correspond to different frequency offsets, and a correspondence between a frequency offset and a wavelength is not a linear relationship, but a curve relationship with a continuously changing slope. A wavelength range of the C-band is between 1530 nm and 1565 nm.

With reference to the formula (1), the formula (2), the formula (3), and the formula (4), a correspondence between a frequency offset and a wavelength $\lambda$/a pixel position p may be expanded, using a Taylor series, into a polynomial shown in the following formula (5) or formula (6):

$$\Delta v = a_0 + a_1 \lambda + a_2 \lambda^2 + a_3 \lambda^3 + \ldots + a_n \lambda^N \quad \text{formula (5), and}$$

$$\Delta v = a_0 + a_1 p + a_2 p^2 + a_3 p^3 + \ldots + a_n p^N \quad \text{formula (6)},$$

where $a_i$ is a coefficient of each polynomial, where i=0, 1, 2, ..., n, and n is an integer greater than or equal to 1, N is an order of each polynomial, N is an integer greater than or equal to 1, and p is a preset pixel position in a channel, for example, a first pixel position or a second pixel position.

Both the formula (5) and the formula (6) may be a frequency offset fitting formula. The formula (5) may be used to represent the correspondence between a frequency offset and a wavelength, and the formula (6) may be used to represent the correspondence between a frequency offset and a pixel position. Usually, the coefficient of each polynomial in the frequency offset fitting formula is also referred to as a fitting coefficient of each polynomial, and is unknown. Therefore, in a frequency offset processing method provided in the following embodiments of this application, the coefficient of each polynomial in the frequency offset fitting formula shown in the formula (5) or the formula (6) may be determined, and then, a frequency offset of a channel in the WSS may be accurately determined.

The following describes, with reference to the accompanying drawings using a plurality of embodiments, a frequency offset processing method provided in the embodiments of this application.

FIG. 5 is a schematic structural diagram 2 of a WSS in a dispersion direction according to an embodiment of this application. As shown in FIG. 5, the WSS may include a collimation lens, a grating, a main lens, a switching engine, an optoelectronic detector, an input port, and at least one output port. One output port may be used as a frequency offset detection port, and is connected to the optoelectronic detector. The other output ports may be used as service ports, and are used to transmit an optical signal carrying service data or information. The switching engine may be an LCOS chip or an MEMS chip.

In a process of performing the frequency offset processing method, calibration light $\lambda_{ref}$ is accessed from the input port of the WSS, and is focused to the switching engine after passing through the collimation lens, the grating, and the main lens. By adjusting phase information of a pixel of the switching engine, the calibration light $\lambda_{ref}$ is switched to a specific port for being output, and the output port is connected to an optoelectronic detector. The optoelectronic detector is used to detect an optical power of the calibration light $\lambda_{ref}$ output by the output port. The output port is the frequency offset detection port.

The WSS may have a plurality of channels, and each channel includes at least one pixel column of the switching engine. A width of each channel may be, for example, 50 gigahertz (GHz), 100 GHz, or another width.

FIG. 6 is a flowchart 1 of a frequency offset processing method according to an embodiment of this application. The method may be performed by a frequency offset processing device. The frequency offset processing device may be referred to as a WSS control device or a WSS calibration device. The frequency offset processing device may be a device that is outside the WSS and that is connected to the optoelectronic detector, or may be a processing chip that locates on a same chip as the WSS and that is connected to the optoelectronic detector. The processing chip may have a processor, for example, a microprocessor. As shown in FIG. 6, the method may include the following steps.

S601: Determine a frequency offset of a preset channel in the WSS, where the preset channel includes at least two channels other than a traffic channel among the plurality of channels of the WSS.

The preset channel may be used for frequency offset monitoring. The preset channel is a frequency offset detection channel among the plurality of channels of the WSS. The frequency offset detection channel is a channel other than a traffic channel among the plurality of channels of the WSS, and service data may not be transmitted on the frequency offset detection channel. The traffic channel among the plurality of channels of the WSS may be used to transmit service data.

Optionally, the preset channel may be distributed on two sides of the traffic channel, and a pixel column included in the preset channel is located in an edge position in the switching engine. The preset channel may be referred to as an edge channel.

The preset channel may include one channel, or may include a plurality of channels. If the preset channel includes a plurality of channels, the plurality of channels may be separately located in symmetrical or asymmetrical positions in the switching engine.

For example, the preset channel may include two channels that are located in an edge position in the switching engine, and the two channels may be located in an edge position at two sides of the switching engine.

In S601, calibration light of a wavelength corresponding to the preset channel may be input to the input port of the WSS, and a frequency offset of the preset channel or a frequency offset of a subchannel of the preset channel may be determined based on an optical power detected by the optoelectronic detector. The frequency offset of the preset channel or the frequency offset of a subchannel of the preset channel may be a frequency offset of a center wavelength or an edge wavelength of the preset channel or the subchannel of the preset channel. In the method, for example, a wavelength of calibration light output by a calibration light source to the input port of the WSS may be controlled by controlling the calibration light source.

For example, if the preset channel includes two channels, for example, the $0^{th}$ channel and the $98^{th}$ channel of the switching engine, a wavelength corresponding to the $0^{th}$ channel may be expressed as $\lambda_0$, and a wavelength corresponding to the $98^{th}$ channel may be expressed as $\lambda_{98}$.

Because each channel in the WSS may include at least one pixel column of the switching engine, the frequency offset of the preset channel may include a frequency offset of at least one pixel column included in the preset channel, where each pixel column has its corresponding frequency offset.

Optionally, in a solution of this application, the frequency offset of the preset channel may include frequency offsets of a plurality of subchannels in the preset channel, and each subchannel may include at least one pixel column.

If each subchannel includes a single pixel column, the frequency offset of the preset channel may include the frequency offsets of the plurality of subchannels in the preset channel, and a frequency offset of each subchannel may be a frequency offset of a center wavelength or an edge wavelength of a filter spectrum generated by the single pixel column.

If each subchannel includes a plurality of pixel columns, the frequency offset of the preset channel may include the frequency offsets of the plurality of subchannels in the preset channel, and a frequency offset of each subchannel may be a frequency offset of a center wavelength or an edge wavelength of a filter spectrum generated by the plurality of pixel columns in each subchannel.

S602: Determine a correspondence between a frequency offset and a wavelength or a correspondence between a frequency offset and a pixel position based on the frequency offset of the preset channel.

In the method, the correspondence between a frequency offset and a wavelength may be fitted based on an actual detected frequency offset of a center wavelength or an edge wavelength of the preset channel or a subchannel of the preset channel and a calibration center wavelength or a calibration edge wavelength of the preset channel or the subchannel of the preset channel; or the correspondence between a frequency offset and a pixel position may be fitted based on a calibration center pixel or a calibration edge pixel of the preset channel or a subchannel of the preset channel. The calibration center wavelength of the preset channel or the subchannel of the preset channel is an International Telecommunication Union (ITU) standard wavelength (or a standard wavelength calculated based on the ITU standard wavelength). The calibration edge wavelength of the preset channel or the subchannel of the preset channel is an ITU standard wavelength (or a standard wavelength calculated based on the ITU standard wavelength) minus or plus half of a channel spacing. The channel spacing is a difference between ITU standard wavelengths (or standard wavelengths calculated based on the ITU standard wavelengths) of adjacent channels. The calibration center pixel of the preset channel or the subchannel of the preset channel is a pixel position corresponding to an ITU standard wavelength (or a standard wavelength calculated based on the ITU standard wavelength). The calibration edge pixel of the preset channel or the subchannel of the preset channel is a pixel position corresponding to an ITU standard wavelength (or a standard wavelength calculated based on the ITU standard wavelength) minus or plus half of a channel spacing. The channel spacing is a difference between ITU standard wavelengths (or standard wavelengths calculated based on the ITU standard wavelengths) of adjacent channels.

For example, in the method, the fitting coefficient of each polynomial in the foregoing frequency offset fitting formula may be determined based on the detected frequency offset of the preset channel or the subchannel of the preset channel and the calibration center wavelength or the calibration edge wavelength of the preset channel or the subchannel of the preset channel. After the fitting coefficient is determined, the correspondence between a frequency offset and a wavelength is determined. Alternatively, in the method, the fitting coefficient of each polynomial in the foregoing frequency offset fitting formula may be determined based on the detected frequency offset of the preset channel or the subchannel of the preset channel and the calibration center pixel or the calibration edge pixel of the preset channel or the subchannel of the preset channel. After the fitting coefficient is determined, the correspondence between a frequency offset and a pixel position is determined.

The foregoing correspondence between a frequency offset and a wavelength may also be referred to as a mathematical expression of a wavelength frequency offset and a wavelength, and the correspondence between a frequency offset and a pixel position may also be referred to as a mathematical expression of a pixel frequency offset and a pixel position.

S603: Determine a frequency offset of the traffic channel according to the correspondence between a frequency offset and a wavelength or the correspondence between a frequency offset and a pixel position.

The traffic channel may include all or some traffic channels of the WSS. To be more specific, in the method, according to the correspondence between a frequency offset and a wavelength or the correspondence between a frequency offset and a pixel position, frequency offsets of all channels in the WSS may be determined, or a frequency offset of a traffic channel in the WSS may be determined.

For example, in the method, the frequency offset of the traffic channel may be determined based on a calibration center wavelength or a calibration edge wavelength of each channel and according to the fitted correspondence between a frequency offset and a wavelength or the fitted correspondence between a frequency offset and a pixel position. The frequency offset of the traffic channel may be a frequency offset of a center wavelength or an edge wavelength of the traffic channel.

Optionally, after the frequency offset of the traffic channel is determined, the method may further include: calibrating the traffic channel based on the frequency offset of the traffic channel.

Because the frequency offset of the traffic channel is the frequency offset of the center wavelength or the edge wavelength of the traffic channel, in the method, the center wavelength or the edge wavelength of the traffic channel may be calibrated based on the frequency offset of the traffic channel. As such, the calibrated center wavelength or the calibrated edge wavelength of the traffic channel is a calibration center wavelength or a calibration edge wavelength of the traffic channel, or a difference between the calibrated center wavelength or the calibrated edge wavelength of the traffic channel and a calibration center wavelength or a calibration edge wavelength of the traffic channel is within a preset range.

For different types of switching engines, channel calibration may be performed in different manners.

For example, if the switching engine is an LCOS chip, in the method, the center wavelength or the edge wavelength of the traffic channel may be calibrated by adjusting phase information of each pixel column of the traffic channel.

If the switching engine is an MEMS chip, in the method, the center wavelength or the edge wavelength of the traffic channel may be calibrated by adjusting a signal transmission direction of each pixel column of the traffic channel.

According to the frequency offset processing method provided in this embodiment, the frequency offset of the preset channel in the WSS may be determined, where the preset channel includes at least two channels other than the traffic channel among the plurality of channels. The correspondence between a frequency offset and a wavelength or the correspondence between a frequency offset and a pixel position may be determined based on the frequency offset of the preset channel. Then, the frequency offset of the traffic channel may be determined according to the correspondence between a frequency offset and a wavelength or the correspondence between a frequency offset and a pixel position. According to the method, a frequency offset of each traffic channel in the WSS can be detected accurately, and then, frequency offset calibration can be performed, thereby improving transmission quality of the traffic channel, avoiding service impairment and interruption, and ensuring normal service operation.

Figure 7:
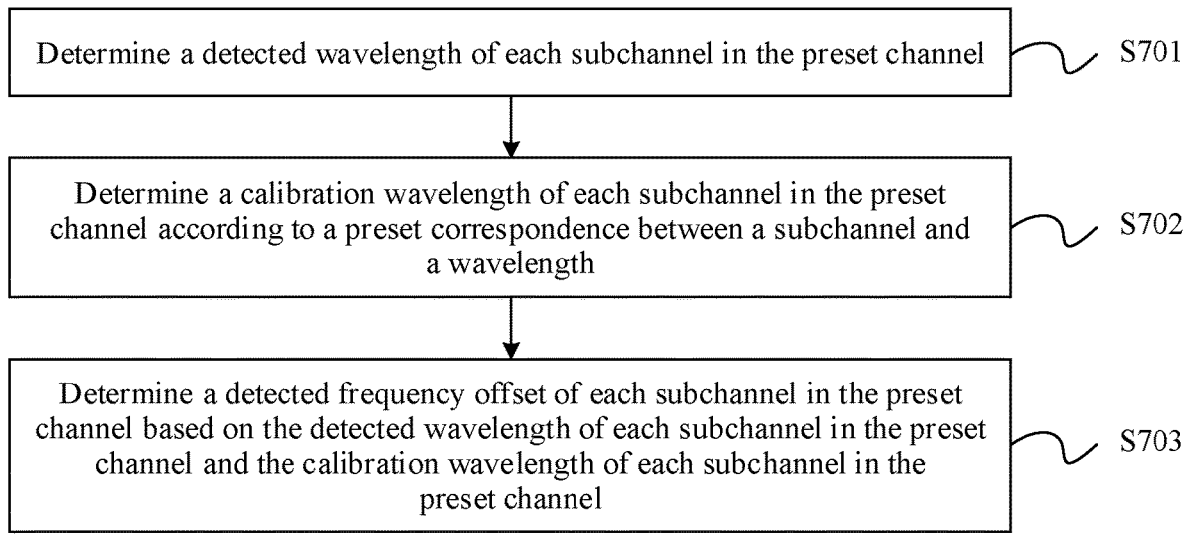
FIG. 7 is a flowchart 2 of a frequency offset processing method according to an embodiment of this application.

Optionally, the embodiments of this application may further provide a frequency offset processing method. FIG. 7 is a flowchart 2 of a frequency offset processing method according to an embodiment of this application. The method shown in FIG. 7 may be a possible example of determining a frequency offset of a preset channel in the method shown in FIG. 6. Certainly, the method for determining a frequency offset of a preset channel may alternatively be another example, and details are not described herein. The frequency offset of the preset channel may include detected frequency offsets of a plurality of subchannels in the preset channel, and each subchannel may include at least one pixel column.

As shown in FIG. 7, the determining a frequency offset of a preset channel in the WSS in S601 shown above may include the following steps.

S701: Determine a detected wavelength of each subchannel in the preset channel.

In an example, the detected wavelength of each subchannel may include a center wavelength of the subchannel.

In the method, the calibration light of the wavelength corresponding to the preset channel may be input to the input port of the WSS, and a phase image of each subchannel in the switching engine may be controlled to form a filter, where no phase is loaded to another subchannel other than each subchannel. As such, a signal reflected by each subchannel is output to the output port of the WSS, that is, the frequency offset detection port; a center wavelength of the step calibration light may be adjusted, and a maximum optical power of the output port of the WSS may be detected. Additionally, the center wavelength of each subchannel may be determined based on the maximum optical power or a minimum insertion loss value of the filter spectrum.

The filter spectrum of each subchannel may be alternatively detected using a conventional grating spectrometer or a high-precision spectrometer that is based on a coherent detection technology.

After a center wavelength of a subchannel in the preset channel is detected, a center wavelength of another subchannel in the preset channel may be detected in a similar manner until a center wavelength of at least one subchannel in the preset channel is obtained.

In another example, the detected wavelength of each subchannel includes an edge wavelength of the subchannel.

In the method, the calibration light of the wavelength corresponding to the preset channel may be input to the input port of the WSS, and a phase image of each subchannel in the switching engine may be controlled to form a filter, where no phase is loaded to another subchannel other than each subchannel. As such, a signal reflected by each subchannel is output to the output port of the WSS, that is, the frequency offset detection port; a center wavelength of the step calibration light may be adjusted, and then, an optical power of the output port of the WSS may be detected and recorded, to generate a filter spectrum corresponding to each subchannel, and a filter spectrum of another subchannel may be obtained in a similar manner; and filter spectra of adjacent subchannels may be compared, and a wavelength with a same insertion loss or a wavelength at an intersection of the filter spectra may be determined as an edge wavelength of each subchannel.

After an edge wavelength of a subchannel in the preset channel is detected, an edge wavelength of another subchannel in the preset channel may be detected in a similar manner until an edge wavelength of at least one subchannel in the preset channel is obtained.

For different types of switching engines, in the method, each subchannel in the switching engines may be controlled in different manners to generate a filter.

In an example, the switching engine may be an LCOS chip, and in the method, phase information of each subchannel in the LCOS chip may be adjusted. As such, a signal reflected by each subchannel is output to the output port of the WSS, that is, the frequency offset detection port, to generate a filter corresponding to each subchannel.

In another example, the switching engine may be an MEMS chip, and in the method, a signal transmission direction corresponding to each subchannel in the MEMS chip may be adjusted. As such, a signal reflected by each subchannel can be output to the output port of the WSS, that is, the frequency offset detection port, to generate a filter corresponding to each subchannel.

Figure 8A:
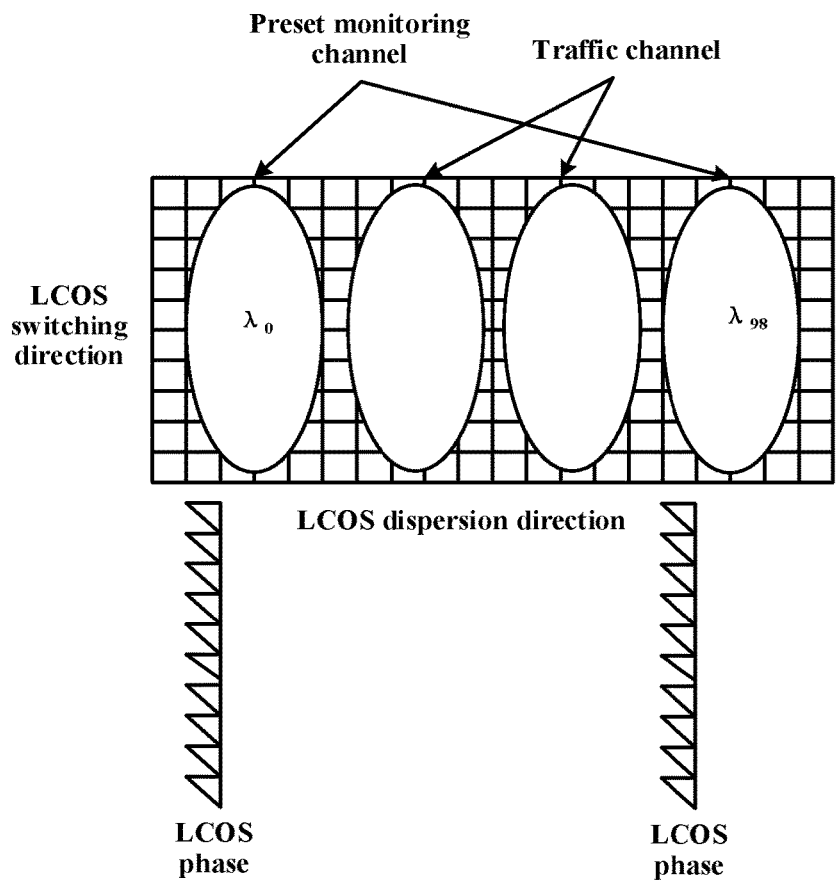
FIG. 8A is a schematic diagram of pixel distribution of calibration light on an LCOS chip in a frequency offset processing method according to an embodiment of this application.
Figure 8B:
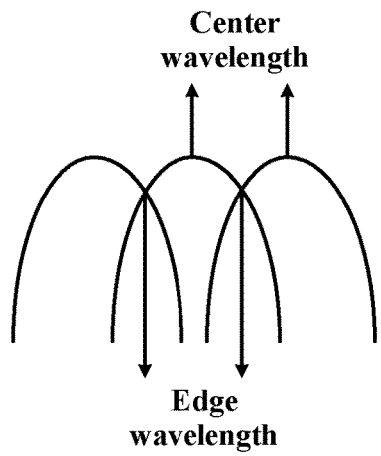
FIG. 8B is a diagram of a correspondence between an edge wavelength and a center wavelength in a frequency offset processing method according to an embodiment of this application.

For example, two channels in an LCOS chip are used as the preset channel for frequency offset detection in the following description. FIG. 8A is a schematic diagram of pixel distribution of calibration light on an LCOS chip in a frequency offset processing method according to an embodiment of this application. FIG. 8B is a diagram of a correspondence between an edge wavelength and a center wavelength in a frequency offset processing method according to an embodiment of this application.

Because the preset channel may be used for frequency offset monitoring, the preset channel may be referred to as a preset monitoring channel, and may include the $0^{th}$ channel and the $98^{th}$ channel in the LCOS chip. The $0^{th}$ channel and the $98^{th}$ channel may be located in two edge positions of the LCOS chip in a dispersion direction that are shown in FIG. 8A.

In the method, a calibration light source may be controlled to output calibration light corresponding to $\lambda_0$ and calibration light corresponding to $\lambda_{98}$, such that the calibration light corresponding to $\lambda_0$ is incident to the $0^{th}$ channel in the LCOS chip shown in FIG. 8A, and the calibration light corresponding to $\lambda_{98}$ is incident to the $98^{th}$ channel in the LCOS chip shown in FIG. 8A.

In the $0^{th}$ channel, for the first pixel column of the LCOS chip in the dispersion direction, in the method, phase information of the first pixel column of the LCOS chip in the dispersion direction in the $0^{th}$ channel may be adjusted. As such, a phase image of the first pixel column of the LCOS chip in the dispersion direction in the $0^{th}$ channel becomes a filter, where no phase is loaded to another pixel column, such that a signal reflected by the first pixel column of the LCOS chip in the dispersion direction in the $0^{th}$ channel is output to the output port of the WSS. A wavelength of the calibration light source may be step-scanned, and an optical power may be detected by the optoelectronic detector at the output port of the WSS, to generate a filter spectrum. Additionally, a center wavelength of the first pixel column of the LCOS chip in the dispersion direction in the $0^{th}$ channel may be determined based on a maximum optical power or a minimum insertion loss value of the filter spectrum.

In the $0^{th}$ channel, for the second pixel column of the LCOS chip in the dispersion direction, a center wavelength of the second pixel column of the LCOS chip in the dispersion direction in the $0^{th}$ channel may be determined in a manner similar to the foregoing manner, until center wavelengths of M pixel columns in the dispersion direction in the $0^{th}$ channel are determined, where M may be an integer greater than or equal to 1.

Similarly, in the $98^{th}$ channel, for the first pixel column of the LCOS chip in the dispersion direction, in the method, phase information of the first pixel column of the LCOS chip in the dispersion direction in the $98^{th}$ channel may be adjusted. As such, a phase image of the first pixel column of the LCOS chip in the dispersion direction in the $98^{th}$ channel becomes a filter, where no phase is loaded to another pixel column, such that a signal reflected by the first pixel column of the LCOS chip in the dispersion direction in the $98^{th}$ channel is output to the output port of the WSS. A wavelength of the calibration light source may be step-scanned, and an optical power may be detected by the optoelectronic detector at the output port of the WSS, to generate a filter spectrum. Additionally, a center wavelength of the first pixel column of the LCOS chip in the dispersion direction in the $98^{th}$ channel may be determined based on a maximum optical power or a minimum insertion loss value of the filter spectrum.

In the $98^{th}$ channel, for the second pixel column of the LCOS chip in the dispersion direction, a center wavelength of the second pixel column of the LCOS chip in the dispersion direction in the $98^{th}$ channel may be determined in a manner similar to the foregoing manner, until center wavelengths of L pixel columns in the dispersion direction in the $98^{th}$ channel are determined, where L may be an integer greater than or equal to 1.

Likewise, a filter spectrum of each pixel column of the LCOS chip in the dispersion direction in the $0^{th}$ channel and the $98^{th}$ channel may be determined in a manner similar to the foregoing manner. In the method, filter spectra of adjacent pixel columns in the $0^{th}$ channel may be compared, and a wavelength at an intersection of filter spectra of two pixel columns, shown in FIG. 8B, may be determined as an edge wavelength of each pixel column in the $0^{th}$ channel. In a similar manner, an edge wavelength of each pixel column in the $98^{th}$ channel may be further obtained.

Figure 9:
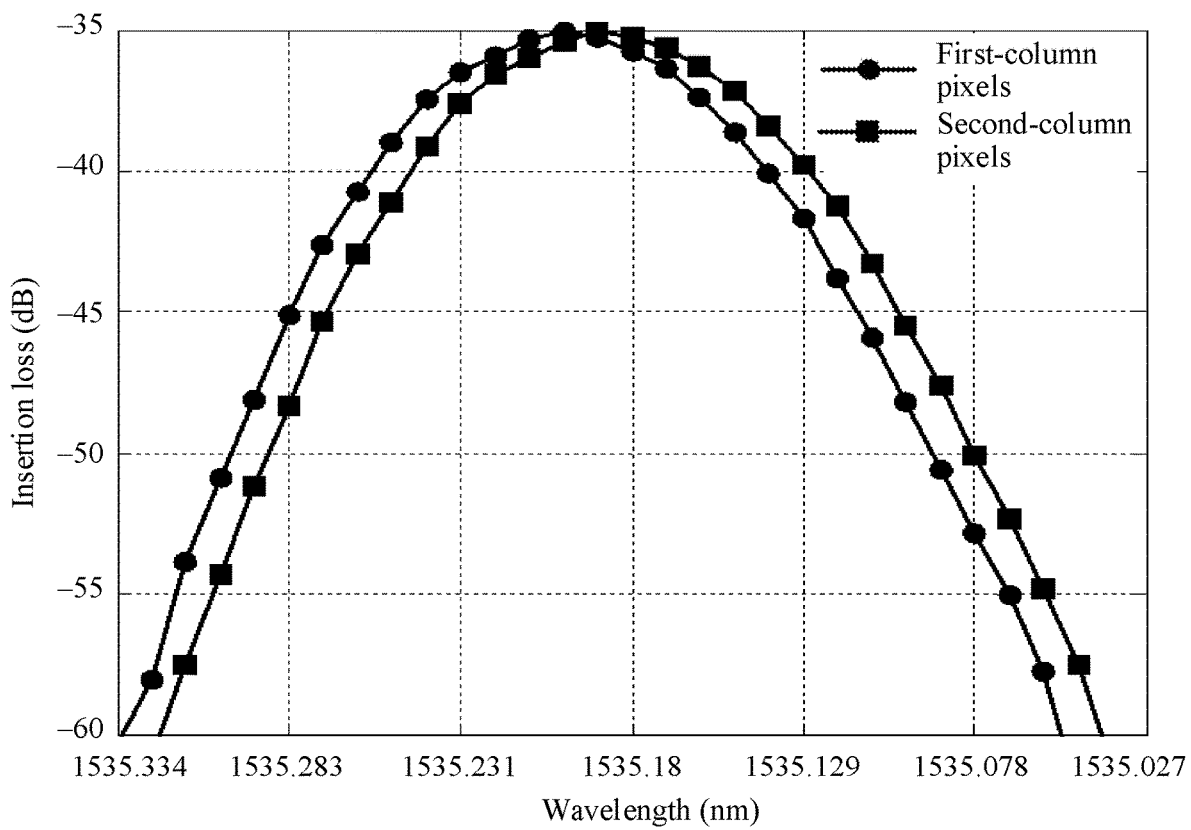
FIG. 9 is a schematic diagram of wavelengths and insertion losses of two pixel columns in an LCOS chip in a frequency offset processing method according to an embodiment of this application.

FIG. 9 is a schematic diagram of wavelengths and insertion losses of two pixel columns in an LCOS chip in a frequency offset processing method according to an embodiment of this application. One of the $0^{th}$ channel and the $98^{th}$ channel is used as an example. It can be learned from FIG. 9 that a wavelength corresponding to a minimum insertion loss value of the first pixel column in the channel is a center wavelength of the first pixel column, and a wavelength corresponding to a minimum insertion loss value of the second pixel column in the channel is a center wavelength of the second pixel column. In the schematic diagram of wavelengths and insertion losses shown in FIG. 9 an output port corresponding to a pixel column with a minimum insertion loss value may have a maximum optical power.

In the foregoing method, the generated filter of a single pixel column may alternatively be a filter of a plurality of pixel columns. Therefore, a center wavelength of the plurality of pixel columns may be a center wavelength of an intermediate pixel column of the plurality of pixel columns. In other words, a subchannel may include a single pixel column or a plurality of pixel columns. The foregoing example is a possible example of a subchannel including a single pixel column. An example of a subchannel including a plurality of pixel columns is similar to the foregoing example, and details are not described herein again.

S702: Determine a calibration wavelength of each subchannel in the preset channel according to a preset correspondence between a subchannel and a wavelength.

The correspondence between a subchannel and a wavelength may be a correspondence between a subchannel and a center wavelength or a correspondence between a subchannel and an edge wavelength.

If the correspondence between a subchannel and a center wavelength is used, a calibration center wavelength of each subchannel may be determined.

If the correspondence between a subchannel and an edge wavelength is used, a calibration edge wavelength of each subchannel may be determined.

The preset correspondence between a subchannel and a center wavelength or an edge wavelength may be a factory-calibrated table of a relationship between a subchannel and a center wavelength or an edge wavelength. The calibration center wavelength of the preset channel or the subchannel of the preset channel is an ITU standard wavelength (or a standard wavelength calculated based on the ITU standard wavelength). The calibration edge wavelength of the preset channel or the subchannel of the preset channel is an ITU standard wavelength (or a standard wavelength calculated based on the ITU standard wavelength) minus or plus half of a channel spacing. The channel spacing is a difference between ITU standard wavelengths (or standard wavelengths calculated based on the ITU standard wavelengths) of adjacent channels. The calibration center pixel of the preset channel or the subchannel of the preset channel is a pixel position corresponding to an ITU standard wavelength (or a standard wavelength calculated based on the ITU standard wavelength). The calibration edge pixel of the preset channel or the subchannel of the preset channel is a pixel position corresponding to an ITU standard wavelength (or a standard wavelength calculated based on the ITU standard wavelength) minus or plus half of a channel spacing. The channel spacing is a difference between ITU standard wavelengths (or standard wavelengths calculated based on the ITU standard wavelengths) of adjacent channels.

In the correspondence between a subchannel and a center wavelength or an edge wavelength, there may be a calibration center wavelength or a calibration edge wavelength of each subchannel in the preset channel. If each subchannel includes one pixel column, the calibration center wavelength or the calibration edge wavelength of each subchannel is a calibration center wavelength or a calibration edge wavelength of the pixel column. If each subchannel includes a plurality of pixel columns, the calibration center wavelength or the calibration edge wavelength of each subchannel may be a calibration center wavelength or a calibration edge wavelength of an intermediate pixel column of the plurality of pixel columns.

With reference to the foregoing example, for the $0^{th}$ channel and the $98^{th}$ channel in the LCOS chip, a calibration center wavelength or a calibration edge wavelength of each subchannel in the $0^{th}$ channel and a calibration center wavelength or a calibration edge wavelength of each subchannel in the $98^{th}$ channel may be obtained by performing S702.

S703: Determine a detected frequency offset of each subchannel in the preset channel based on the detected wavelength of each subchannel in the preset channel and the calibration wavelength of each subchannel in the preset channel.

If the detected wavelength of each subchannel is a detected center wavelength of each subchannel, and the calibration wavelength of each subchannel is a calibration center wavelength of each subchannel, a detected frequency offset of the center wavelength of each subchannel may be obtained by performing S703.

If the detected wavelength of each subchannel is a detected edge wavelength of each subchannel, and the calibration wavelength of each subchannel is a calibration edge wavelength of each subchannel, a detected frequency offset of the edge wavelength of each subchannel may be obtained by performing S703.

The detected center wavelength or the detected edge wavelength of each subchannel may be a detected center wavelength or a detected edge wavelength of each subchannel detected by performing S701. The calibration center wavelength or the calibration edge wavelength of each subchannel may be a preset calibration center wavelength or a preset calibration edge wavelength of each subchannel.

In the method, for example, it may be determined, based on a difference between the actual detected center wavelength or the actual detected edge wavelength of each subchannel and the calibration center wavelength or the calibration edge wavelength of each subchannel, that the frequency offset of each subchannel is the frequency offset of the center wavelength or the edge wavelength of each subchannel.

A detected frequency offset of at least one subchannel in the preset channel may be obtained by performing S703. The at least one subchannel may be all or some subchannels in the preset channel.

According to the frequency offset processing method provided in this embodiment, the detected frequency offset of each subchannel in the preset channel in the WSS may be determined using the provided examples, such that the detected frequency offset of each subchannel in the preset channel is more accurate, and the frequency offset of the traffic channel in the WSS is therefore more accurate. Therefore, the frequency offset of the traffic channel can be accurately detected using the method. Then, frequency offset calibration is performed, thereby improving transmission quality of each traffic channel, avoiding service impairment and interruption, and ensuring normal service operation.

Figure 10:
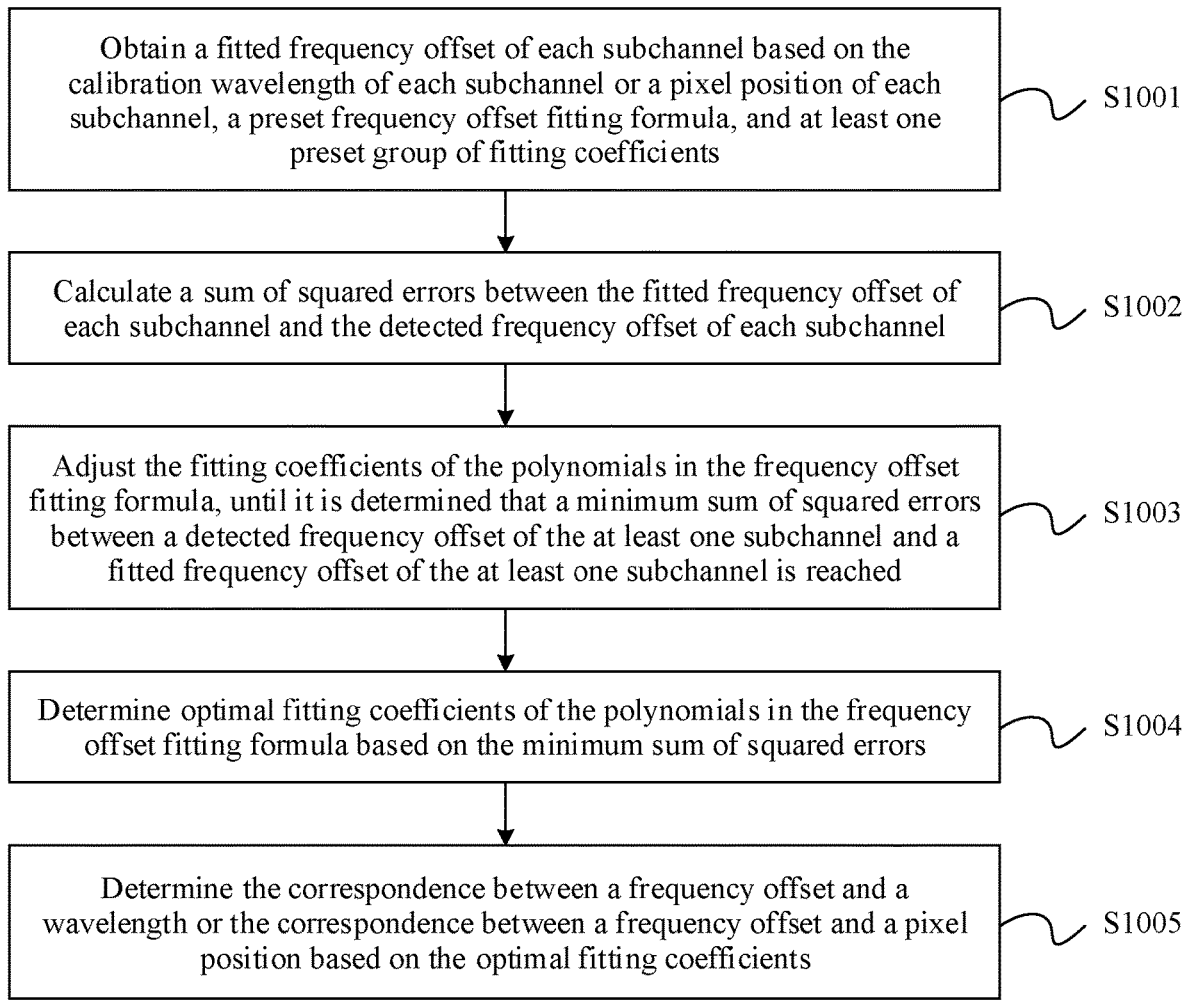
FIG. 10 is a flowchart 3 of a frequency offset processing method according to an embodiment of this application.

Optionally, the embodiments of this application may further provide a frequency offset processing method. FIG. 10 is a flowchart 3 of a frequency offset processing method according to an embodiment of this application. The method shown in FIG. 10 may be a possible example of determining a correspondence between a frequency offset and a wavelength or a correspondence between a frequency offset and a pixel position based on the frequency offset of the preset channel in the foregoing method. The frequency offset of the preset channel may include a frequency offset of at least one subchannel in the preset channel, and each subchannel may include at least one pixel column.

As shown in FIG. 10, the foregoing S602 of determining a correspondence between a frequency offset and a wavelength or a correspondence between a frequency offset and a pixel position based on the frequency offset of the preset channel may include the following steps.

S1001: Obtain a fitted frequency offset of each subchannel based on the calibration wavelength of each subchannel or a pixel position of each subchannel, a preset frequency offset fitting formula, and at least one preset group of fitting coefficients.

The calibration wavelength may be a calibration center wavelength or a calibration edge wavelength. Each group of fitting coefficients includes a group of fitting coefficients of polynomials in the frequency offset fitting formula.

The frequency offset fitting formula may be, for example, the frequency offset fitting formula shown in the foregoing formula (5) or formula (6).

The at least one group of fitting coefficients may be candidate fitting coefficients of the frequency offset fitting formula, and each group of fitting coefficients includes the fitting coefficients of the polynomials in the frequency offset fitting formula.

S1002: Calculate a sum of squared errors between the fitted frequency offset of each subchannel and the detected frequency offset of each subchannel.

S1003: Adjust the fitting coefficients of the polynomials in the frequency offset fitting formula, until it is determined that a minimum sum of squared errors between a detected frequency offset of the at least one subchannel and a fitted frequency offset of the at least one subchannel is reached.

S1004: Determine optimal fitting coefficients of the polynomials in the frequency offset fitting formula based on the minimum sum of squared errors.

S1005: Determine the correspondence between a frequency offset and a wavelength or the correspondence between a frequency offset and a pixel position based on the optimal fitting coefficients.

The optimal fitting coefficients may be fitting coefficients that are in the at least one group of fitting coefficients and that are used when the minimum sum of squared errors is obtained.

In other words, when the fitting coefficients of the polynomials in the frequency offset fitting formula are the optimal fitting coefficients, the minimum sum of squared errors between a detected frequency offset of the at least one subchannel and a fitted frequency offset of the at least one subchannel may be reached.

When the fitting coefficients of the polynomials in the frequency offset fitting formula are the optimal fitting coefficients, the frequency offset fitting formula may be an optimal function of a relationship between a frequency offset and a wavelength or an optimal function of a relationship between a frequency offset and a pixel position, that is, an optimal correspondence between a frequency offset and a wavelength or an optimal correspondence between a frequency offset and a pixel position can be obtained. The frequency offset of the traffic channel obtained according to the optimal correspondence between a frequency offset and a wavelength or the optimal correspondence between a frequency offset and a pixel position is more accurate, thereby implementing accurate frequency offset detection.

For example, the following uses an example for description in which a single pixel column is used as one subchannel. In the method, the optimal fitting coefficients of the polynomials in the frequency offset fitting formula may be determined using the following formula (7):

$$[a_0, a_1, \ldots, a_n] = \arg\left\{\sum_{q=1}^{P} |\Delta v_q - (a_0 + a_1\lambda_q + a_2\lambda_q^2 + a_3\lambda_q^3 + \ldots + a_n\lambda_q^N)|^2\right\}, \quad \text{formula (7)}$$

where P is an integer greater than or equal to 2 and less than or equal to a quantity of pixel columns of the preset channel; $\Delta v_q$ is a detected frequency offset of a wavelength of a single pixel column; $a_i$ is a fitting coefficient of each polynomial in the frequency offset fitting formula, where i=0, 1, 2, ..., n, and n is an integer greater than or equal to 1 and less than or equal to P−1; $\lambda_q$ is a calibration wavelength of a single pixel column; and N is an order of each polynomial, and N is an integer greater than or equal to 1 and less than or equal to P−1, where the calibration wavelength may be a calibration center wavelength or a calibration edge wavelength.

If the preset channel includes one channel, the quantity of pixel columns of the preset channel may be a quantity of pixel columns included in the channel. If the preset channel includes a plurality of channels, the quantity of pixel columns of the preset channel may be a sum of quantities of pixel columns included in the plurality of channels.

Assuming that the preset channel includes the foregoing described $0^{th}$ channel and $98^{th}$ channel in the LCOS chip, the quantity of pixel columns of the preset channel may be a sum of a quantity of pixel columns of the $0^{th}$ channel and a quantity of pixel columns of the $98^{th}$ channel, that is, a sum of M and L.

If the preset channel includes a plurality of channels, for example, the $0^{th}$ channel and the $98^{th}$ channel in the LCOS chip, different channels among the plurality of channels may include a same or different quantity of pixel columns.

When a minimum sum of squared errors is reached, the optimal fitting coefficients of the polynomials in the frequency offset fitting formula may be obtained.

After the optimal fitting coefficient $a_i$ of each polynomial is obtained, calibration wavelengths of pixel columns of other channels in the LCOS chip are substituted into the formula (5). Then, frequency offsets of a plurality of channels in the LCOS chip, that is, frequency offsets of center wavelengths or edge wavelengths of the plurality of channels are obtained. After the optimal fitting coefficient $a_i$ of each polynomial is obtained, calibration wavelengths or pixel positions of pixel columns of other channels in the LCOS chip are substituted into the formula (6). Then, frequency offsets of a plurality of channels in the LCOS chip, that is, frequency offsets of center wavelengths or edge wavelengths of the plurality of channels may also be obtained.

The following describes schematic diagrams of detected frequency offsets and fitting results of center wavelengths of channels obtained using the method in this application at different ambient temperatures.

Figure 11A:
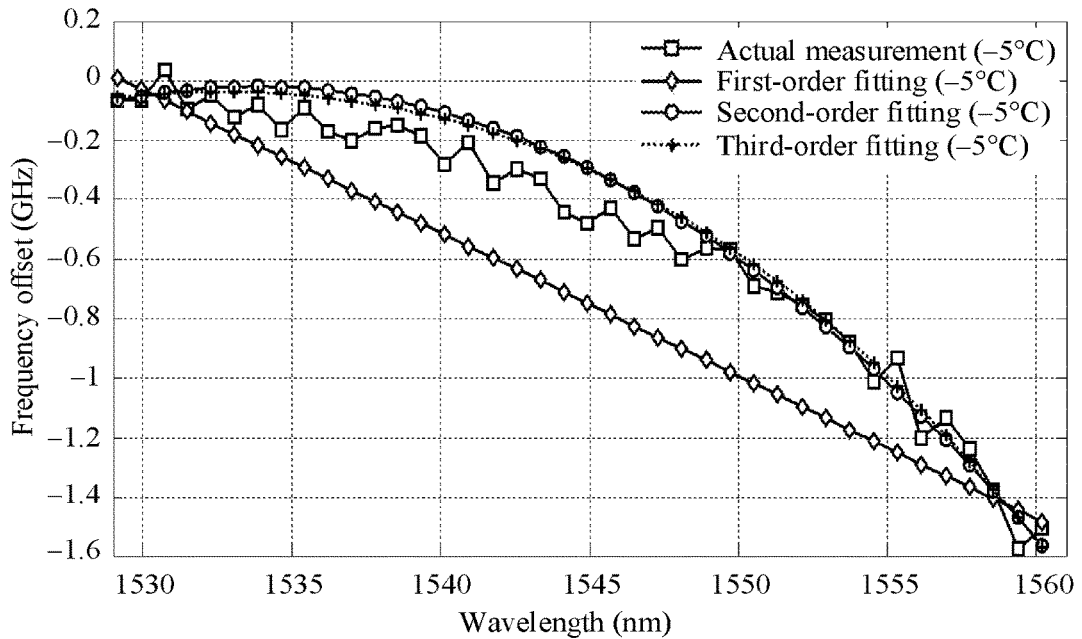
FIG. 11A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of −5° C.

FIG. 11A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of −5° C. FIG. 11A shows a curve of detected frequency offsets of 40 channels in a WSS operating on a C-band and curves of frequency offsets of the 40 channels obtained through least square polynomial fitting, where both the detected and fitted frequency offsets are obtained at an ambient temperature of −5° C., where a channel spacing is 100 GHz.

It can be learned from FIG. 11A that among the detected frequency offsets of the 40 channels in the WSS operating on the C-band, a largest channel frequency offset is 1.57 GHz. When least square polynomial fitting provided in this embodiment of this application is used for frequency offset fitting, detected frequency offsets of four pixel columns of an edge channel on the left and detected frequency offsets of four pixel columns of an edge channel on the right may be used.

For least square polynomial fitting, first-order fitting may be used, or multi-order fitting may be used, for example, second-order fitting or third-order fitting. The first-order fitting includes a constant term and a first-order polynomial; the second-order fitting includes a constant term, a first-order polynomial, and a second-order polynomial; and the third-order fitting includes a constant term, a first-order polynomial, a second-order polynomial, and a third-order polynomial. The following descriptions are the same.

It can be learned from FIG. 11A that frequency offset results of the channels of the WSS obtained in second-order and third-order fitting manners are quite close to the actually measured frequency offset results, and can better match a curve function relationship between an actually measured frequency offset and a channel center wavelength, and there is a great improvement compared to a first-order linear fitting manner.

Figure 11B:
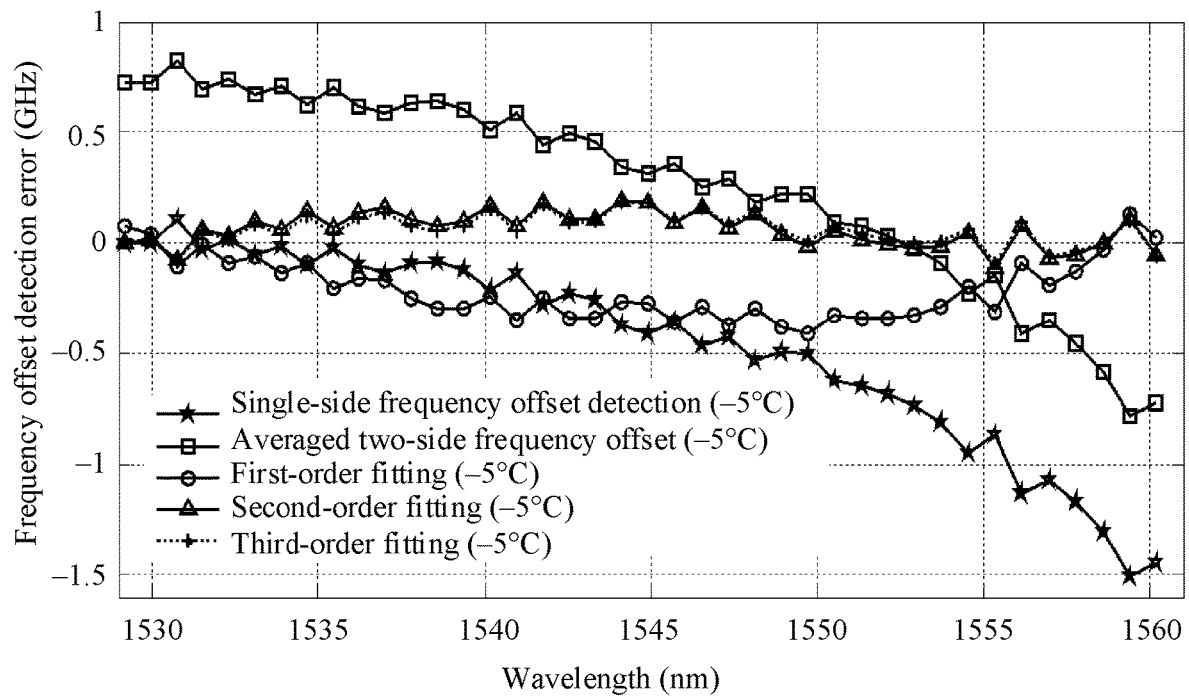
FIG. 11B is a schematic diagram of frequency offset detection errors of a WSS obtained at an ambient temperature of −5° C. and in a least square polynomial fitting manner, a single-side frequency offset detection manner, and an averaged two-side frequency offset detection manner in a frequency offset processing method according to an embodiment of this application.

FIG. 11B is a schematic diagram of frequency offset detection errors of a WSS obtained at an ambient temperature of −5° C. and in a least square polynomial fitting manner, a single-side frequency offset detection manner, and an averaged two-side frequency offset detection manner in a frequency offset processing method according to an embodiment of this application.

It can be learned from FIG. 11B that a maximum channel frequency offset detection error, of 40 channels in a WSS operating on a C-band, obtained in the single-side frequency offset detection manner is 1.51 GHz, a maximum channel frequency offset detection error, of the 40 channels in the WSS operating on the C-band, obtained in the averaged two-side frequency offset detection manner is 0.825 GHz, a maximum channel frequency offset detection error, of the 40 channels in the WSS operating on the C-band, obtained in the first-order linear fitting manner is 0.411 GHz, a maximum channel frequency offset detection error, of the 40 channels in the WSS operating on the C-band, obtained in the second-order linear fitting manner is 0.187 GHz, and a maximum channel frequency offset detection error, of the 40 channels in the WSS operating on the C-band, obtained in the third-order linear fitting manner is 0.184 GHz.

Figure 12A:
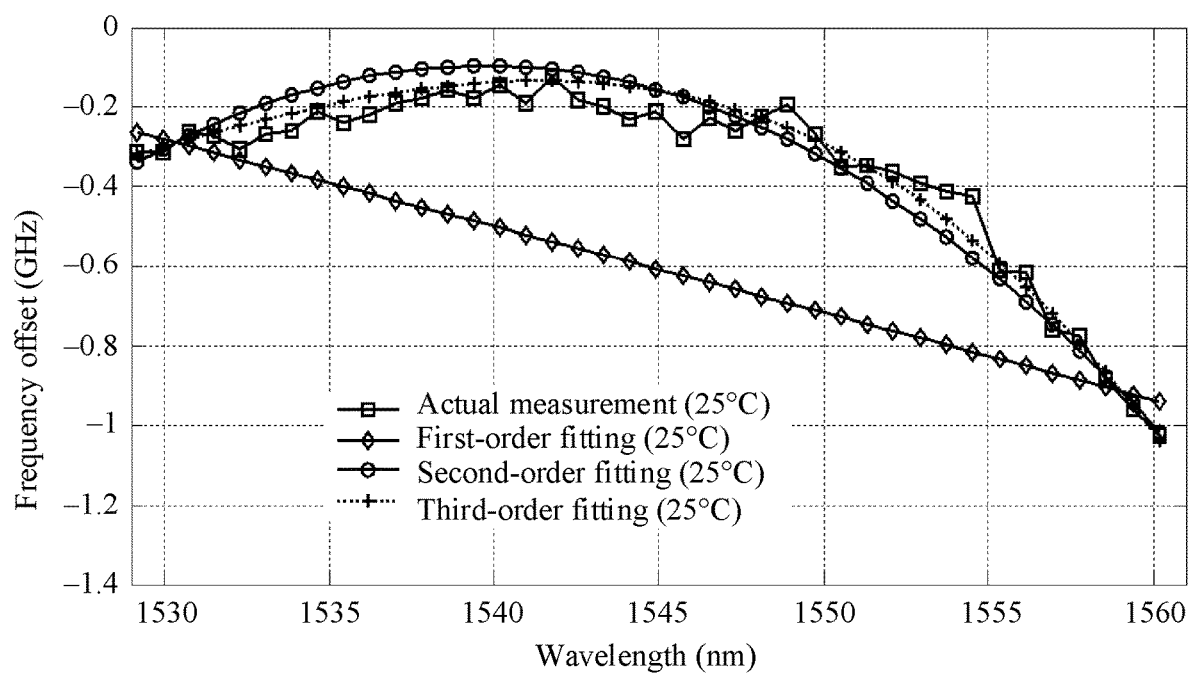
FIG. 12A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of 25° C.

FIG. 12A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of 25° C. FIG. 12A shows a curve of detected frequency offsets of 40 channels in a WSS operating on a C-band and curves of frequency offsets of the 40 channels obtained through least square polynomial fitting, where both the detected and fitted frequency offsets are obtained at an ambient temperature of 25° C., where a channel spacing is 100 GHz.

It can be learned from FIG. 12A that among the detected frequency offsets of the 40 channels in the WSS operating on the C-band, a largest channel frequency offset is 1.03 GHz. When least square polynomial fitting provided in this embodiment of this application is used for frequency offset fitting, detected frequency offsets of four pixel columns of an edge channel on the left and detected frequency offsets of four pixel columns of an edge channel on the right may be used.

For least square polynomial fitting, first-order fitting may be used, or multi-order fitting may be used, for example, second-order fitting or third-order fitting. The first-order fitting includes a constant term and a first-order polynomial; the second-order fitting includes a constant term, a first-order polynomial, and a second-order polynomial; and the third-order fitting includes a constant term, a first-order polynomial, a second-order polynomial, and a third-order polynomial. The following expressions are the same.

It can be learned from FIG. 12A that frequency offset results of the channels of the WSS obtained in second-order and third-order fitting manners are quite close to the actually measured frequency offset results, and can better match a curve function relationship between an actually measured frequency offset and a channel center wavelength, and there is a great improvement compared to first-order linear fitting.

Figure 12B:
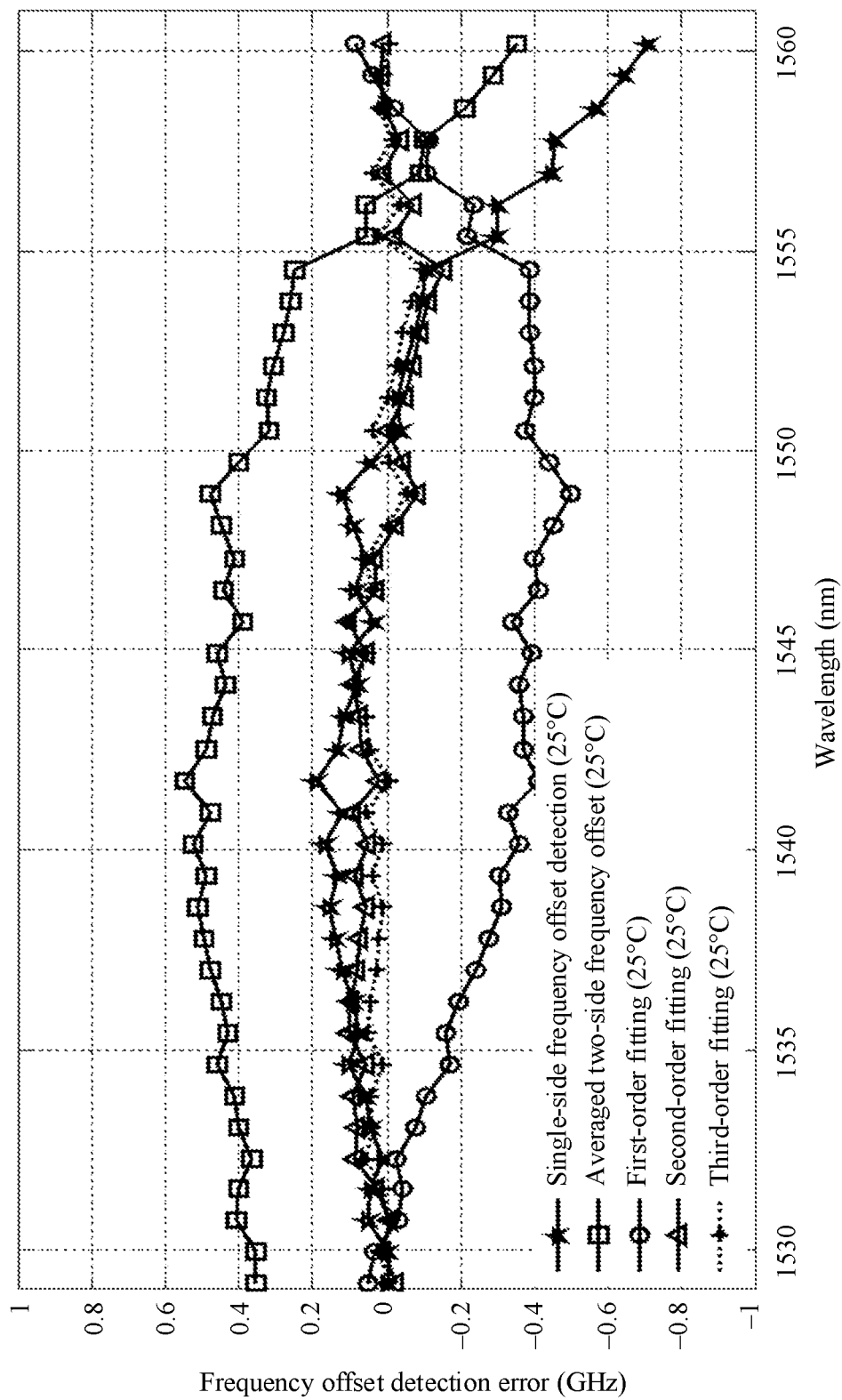
FIG. 12B is a schematic diagram of frequency offset detection errors of a WSS obtained at an ambient temperature of 25° C. and in a least square polynomial fitting manner, a single-side frequency offset detection manner, and an averaged two-side frequency offset detection manner in a frequency offset processing method according to an embodiment of this application.

FIG. 12B is a schematic diagram of frequency offset detection errors of a WSS obtained at an ambient temperature of 25° C. and in a least square polynomial fitting manner, a single-side frequency offset detection manner, and an averaged two-side frequency offset detection manner in a frequency offset processing method according to an embodiment of this application.

It can be learned from FIG. 12B that a maximum channel frequency offset detection error, of 40 channels in a WSS operating on a C-band, obtained in the single-side frequency offset detection manner is 0.713 GHz, a maximum channel frequency offset detection error, of the 40 channels in the WSS operating on the C-band, obtained in the averaged two-side frequency offset detection manner is 0.544 GHz, a maximum channel frequency offset detection error, of the 40 channels in the WSS operating on the C-band, obtained in the first-order linear fitting manner is 0.498 GHz, a maximum channel frequency offset detection error, of the 40 channels in the WSS operating on the C-band, obtained in the second-order linear fitting manner is 0.155 GHz, and a maximum channel frequency offset detection error, of the 40 channels in the WSS operating on the C-band, obtained in the third-order linear fitting manner is 0.11 GHz.

Figure 13A:
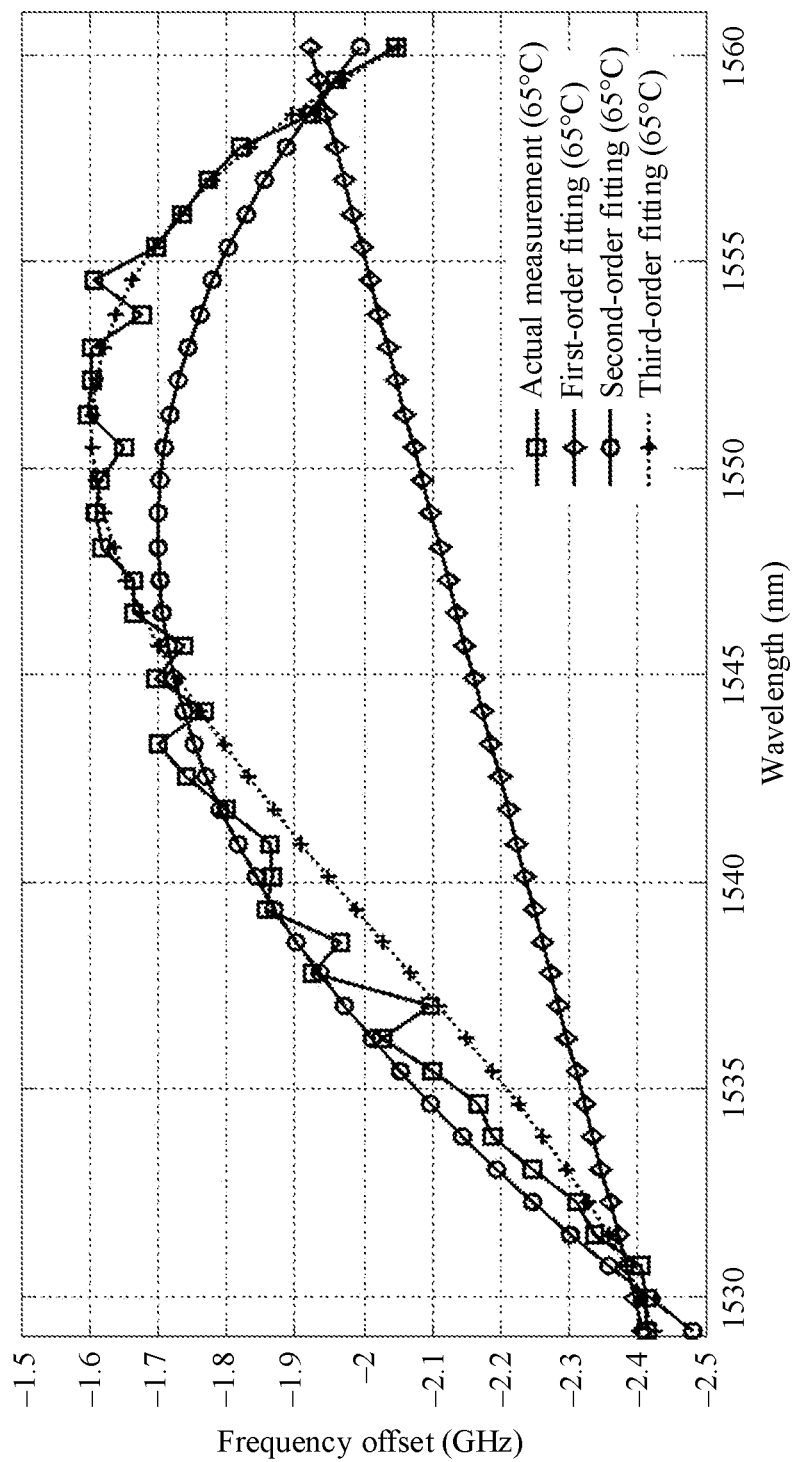
FIG. 13A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of 65° C.

FIG. 13A is a schematic diagram of detected frequency offsets of a WSS and frequency offsets of the WSS obtained through least square polynomial fitting in a frequency offset processing method according to an embodiment of this application, where both the detected and fitted frequency offsets are obtained at an ambient temperature of 65° C. FIG. 13A shows a curve of detected frequency offsets of 40 channels in a WSS operating on a C-band and curves of frequency offsets of the 40 channels obtained through least square polynomial fitting, where both the detected and fitted frequency offsets are obtained at an ambient temperature of 65° C., where a channel spacing is 100 GHz.

It can be learned from FIG. 13A that among the detected frequency offsets of the 40 channels in the WSS operating on the C-band, a largest channel frequency offset is 2.41 GHz. When least square polynomial fitting provided in this embodiment of this application is used for frequency offset fitting, detected frequency offsets of four pixel columns of an edge channel on the left and detected frequency offsets of four pixel columns of an edge channel on the right may be used.

For least square polynomial fitting, first-order fitting may be used, or multi-order fitting may be used, for example, second-order fitting or third-order fitting. The first-order fitting includes a constant term and a first-order polynomial; the second-order fitting includes a constant term, a first-order polynomial, and a second-order polynomial; and the third-order fitting includes a constant term, a first-order polynomial, a second-order polynomial, and a third-order polynomial. The following expressions are the same.

It can be learned from FIG. 13A that frequency offset results of the channels of the WSS obtained in second-order and third-order fitting manners are quite close to the actually measured frequency offset results, and can better match a curve function relationship between an actually measured frequency offset and a channel center wavelength, and there is a great improvement compared to first-order linear fitting.

Figure 13B:
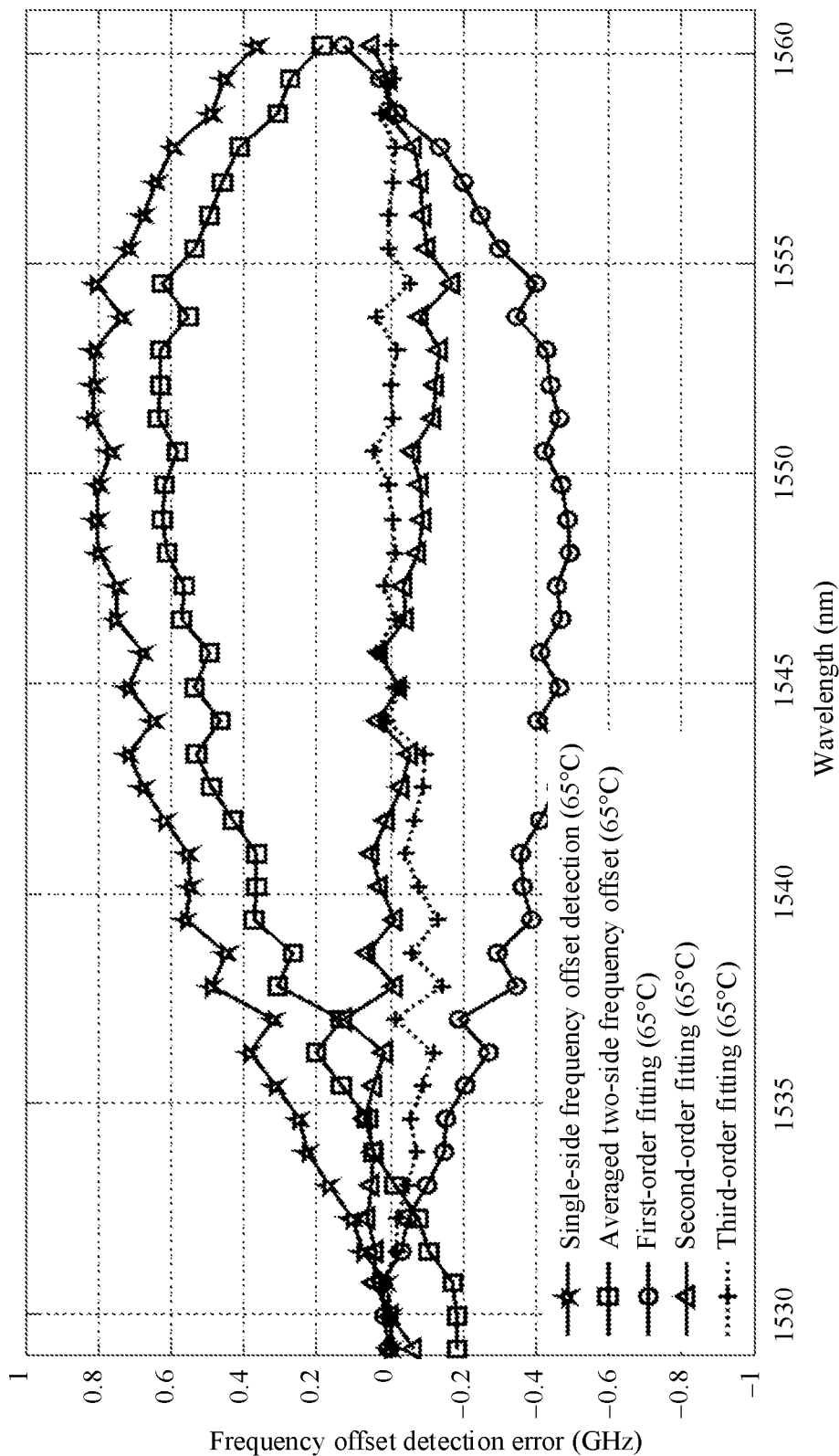
FIG. 13B is a schematic diagram of frequency offset detection errors of a WSS obtained at an ambient temperature of 65° C. and in a least square polynomial fitting manner, a single-side frequency offset detection manner, and an averaged two-side frequency offset detection manner in a frequency offset processing method according to an embodiment of this application.

FIG. 13B is a schematic diagram of frequency offset detection errors of a WSS obtained at an ambient temperature of 65° C. and in a least square polynomial fitting manner, a single-side frequency offset detection manner, and an averaged two-side frequency offset detection manner in a frequency offset processing method according to an embodiment of this application.

It can be learned from FIG. 13B that a maximum channel frequency offset detection error, of 40 channels in a WSS operating on a C-band, obtained in the single-side frequency offset detection manner is 0.815 GHz, a maximum channel frequency offset detection error, of the 40 channels in the WSS operating on the C-band, obtained in the averaged two-side frequency offset detection manner is 0.632 GHz, a maximum channel frequency offset detection error, of the 40 channels in the WSS operating on the C-band, obtained in the first-order linear fitting manner is 0.493 GHz, a maximum channel frequency offset detection error, of the 40 channels in the WSS operating on the C-band, obtained in the second-order linear fitting manner is 0.173 GHz, and a maximum channel frequency offset detection error, of the 40 channels in the WSS operating on the C-band, obtained in the third-order linear fitting manner is 0.145 GHz.

With reference to the foregoing examples shown in FIG. 11A to FIG. 13B, it can be learned that a method in which the optimal fitting coefficients of the polynomials in the frequency offset fitting formula are determined in the least square polynomial fitting manner provided in this embodiment of this application. Then, frequency offset fitting detection is performed for channels implements a comparatively great improvement in accuracy of frequency offset detection performed for the channels, compared to the single-side frequency offset detection method and the averaged two-side edge-channel frequency offset detection method. In the foregoing examples at three different temperatures, when polynomial high-order fitting such as second-order fitting or third-order fitting is used, a frequency offset detection error can be reduced to below 0.2 GHz. It should be noted that when higher order fitting is used, a more accurate fitting coefficient is obtained, and frequency offset detection subsequently performed is also more accurate. However, this requires more actual frequency offset detection data of edge channels on two sides.

According to the method provided in this embodiment of this application, the optimal fitting coefficients of the polynomials in the frequency offset fitting formula may be obtained through least square fitting. As such, the coefficients that are of the polynomials and that are obtained through fitting are more accurate, and the frequency offset fitting formula can more accurately ensure the correspondence between a frequency offset and a wavelength or the correspondence between a frequency offset and a pixel position in the WSS, thereby implementing more accurate frequency offset detection. Then, frequency offset calibration is performed, thereby improving transmission quality of each channel, avoiding service impairment and interruption, and ensuring normal service operation.

Figure 14:
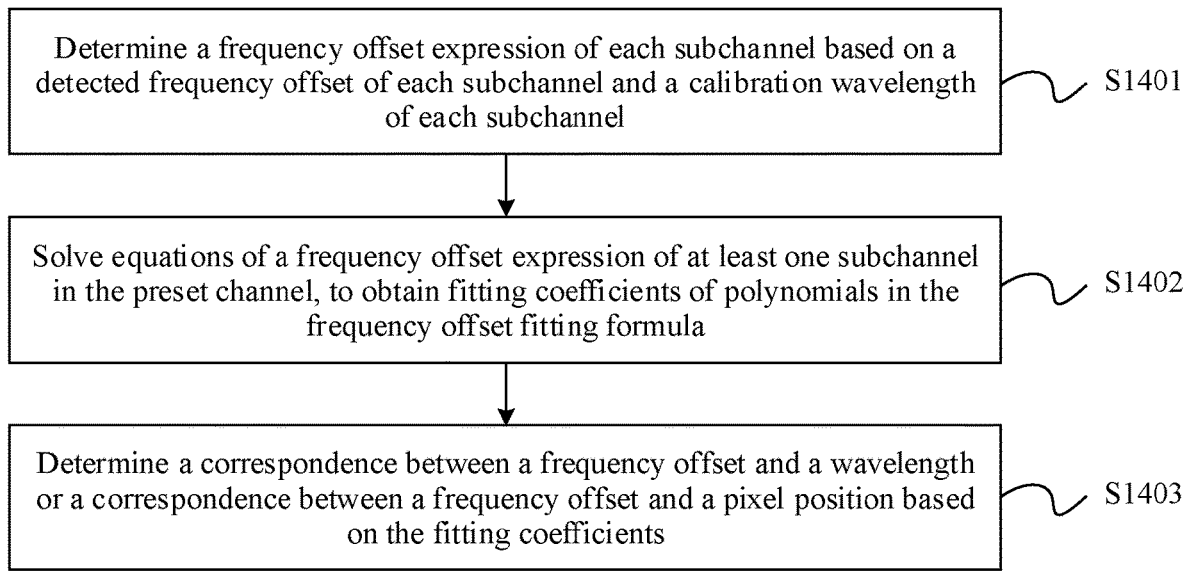
FIG. 14 is a flowchart 4 of a frequency offset processing method according to an embodiment of this application.

Optionally, the embodiments of this application may further provide a frequency offset processing method. FIG. 14 is a flowchart 4 of a frequency offset processing method according to an embodiment of this application. The method shown in FIG. 14 may be another possible example of determining a correspondence between a frequency offset and a wavelength or a correspondence between a frequency offset and a pixel position based on the frequency offset of the preset channel in the foregoing method. The frequency offset of the preset channel may include a frequency offset of at least one subchannel in the preset channel, and each subchannel may include at least one pixel column.

As shown in FIG. 14, the foregoing S602 of determining a correspondence between a frequency offset and a wavelength or a correspondence between a frequency offset and a pixel position based on the frequency offset of the preset channel may include the following steps.

S1401: Determine a frequency offset expression of each subchannel based on the detected frequency offset of each subchannel and the calibration wavelength of each subchannel or a pixel position of each subchannel.

The calibration wavelength may be a calibration center wavelength or a calibration edge wavelength. A calibration center wavelength or a calibration edge wavelength of each subchannel may be a preset center wavelength or a preset edge wavelength of each subchannel.

In the method, the frequency offset expression of each subchannel may be determined based on the frequency offset of each subchannel, the calibration wavelength of each subchannel, and a frequency offset fitting formula.

S1402: Solve equations of a frequency offset expression of at least one subchannel in the preset channel, to obtain fitting coefficients of monomials in the frequency offset fitting formula.

S1403: Determine the correspondence between a frequency offset and a wavelength or the correspondence between a frequency offset and a pixel position based on the fitting coefficients.

In the frequency offset expression of each subchannel, fitting coefficients of polynomials are unknown. Therefore, in the method, the fitting coefficients of the polynomials in the frequency offset fitting formula may be obtained by solving the equations of the frequency offset expression of the at least one subchannel.

A quantity of the at least one subchannel is equal to a quantity of the polynomials in the frequency offset fitting formula.

For example, the following uses an example for description in which a single pixel column is used as one subchannel. In the method, the fitting coefficients of the polynomials in the frequency offset fitting formula may be determined by solving equations shown in the following formula (8):

$$\begin{cases} \Delta v_1 = a_0 + a_1\lambda_1 + a_2\lambda_1^2 + a_3\lambda_1^3 + \ldots + a_n\lambda_1^N \\ \Delta v_2 = a_0 + a_1\lambda_2 + a_2\lambda_2^2 + a_3\lambda_2^3 + \ldots + a_n\lambda_2^N \\ \vdots \\ \Delta v_P = a_0 + a_1\lambda_P + a_2\lambda_P^2 + a_3\lambda_P^3 + \ldots + a_n\lambda_P^N \end{cases} \quad \text{formula (8)}$$

where P is an integer greater than or equal to 2 and less than or equal to a quantity of pixel columns of the preset channel; $\Delta v_P$ is a detected frequency offset of a wavelength of a single pixel column; and $a_i$ is a fitting coefficient of each polynomial in the frequency offset fitting formula, where i=0, 1, 2, . . . , n, n is an integer greater than or equal to 1 and less than or equal to P−1, and P is equal to a quantity n+1 of polynomials; and $\lambda$ is a calibration wavelength of a single pixel column; and N is an order of each polynomial, and N is an integer greater than or equal to 1 and less than or equal to P−1, where a quantity P of pieces of data is equal to a quantity n+1 of polynomials. The equations (8) are directly solved, to obtain the coefficient of each polynomial.

Assuming that the preset channel includes the foregoing described $0^{th}$ channel and $98^{th}$ channel in the LCOS chip, the quantity of pixel columns of the preset channel may be a sum of a quantity of pixel columns of the $0^{th}$ channel and a quantity of pixel columns of the $98^{th}$ channel, that is, a sum of M and L.

If the preset channel includes a plurality of channels, for example, the $0^{th}$ channel and the $98^{th}$ channel in the LCOS chip, different channels among the plurality of channels may include a same or different quantity of pixel columns. When different channels among the plurality of channels include a same quantity of pixel columns, the optimal fitting coefficients that are of the polynomials in the frequency offset fitting formula and that are obtained through fitting may be more accurate.

After the fitting coefficient $a_i$ of each polynomial is obtained, calibration wavelengths of subchannels of other channels in the LCOS chip are substituted into the formula (5). Then, frequency offsets of a plurality of channels in the LCOS chip, that is, frequency offsets of wavelengths of the plurality of channels are obtained. After the optimal fitting coefficient $a_i$ of each polynomial is obtained, calibration pixel positions of pixel columns of other channels in the LCOS chip are substituted into the formula (6). Then, frequency offsets of a plurality of channels in the LCOS chip, that is, frequency offsets of wavelengths of the plurality of channels may also be obtained.

According to the method provided in this embodiment of this application, the fitting coefficients of the polynomials in the frequency offset fitting formula may be obtained by solving equations. As such, the coefficients that are of the polynomials and that are obtained through fitting are more accurate, and the frequency offset fitting formula can more accurately ensure the correspondence between a frequency offset and a wavelength or the correspondence between a frequency offset and a pixel position in the WSS, thereby implementing more accurate frequency offset detection. Then, frequency offset calibration is performed, thereby improving transmission quality of each channel, avoiding service impairment and interruption, and ensuring normal service operation.

It may be understood that the frequency offset processing methods shown in FIG. 6 to FIG. 14 may be implemented separately, or may be used in combination. This is not limited herein.

Figure 15:
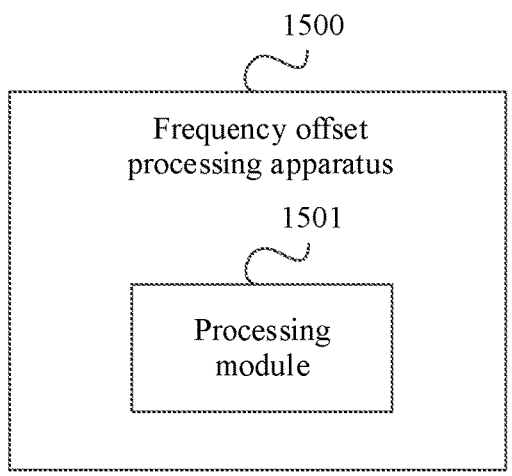
FIG. 15 is a schematic structural diagram of a frequency offset processing apparatus according to an embodiment of this application.

The following describes, using examples and with reference to the accompany drawings, a frequency offset processing apparatus and device, and the like provided in the embodiments of this application. FIG. 15 is a schematic structural diagram of a frequency offset processing apparatus according to an embodiment of this application. As shown in FIG. 15, the frequency offset processing apparatus 1500 may include a processing module 1501.

The processing module 1501 is configured to: determine a frequency offset of a preset channel in a WSS, where the preset channel includes at least two channels other than a traffic channel among a plurality of channels; determine a correspondence between a frequency offset and a wavelength or a correspondence between a frequency offset and a pixel position based on the frequency offset of the preset channel; and determine a frequency offset of the traffic channel according to the correspondence between a frequency offset and a wavelength or the correspondence between a frequency offset and a pixel position.

In a possible implementation, the frequency offset of the preset channel includes detected frequency offsets of a plurality of subchannels in the preset channel, and each subchannel includes at least one pixel column.

In another possible implementation, the processing module 1501 is configured to: determine a detected wavelength of each subchannel in the preset channel; determine a calibration wavelength of each subchannel in the preset channel according to a preset correspondence between a subchannel and a wavelength; and determine a detected frequency offset of each subchannel based on the detected wavelength of each subchannel and the calibration wavelength of each subchannel.

In still another possible implementation, the detected wavelength of each subchannel is a center wavelength, and a switching engine is an LCOS chip. Additionally, the processing module 1501 is configured to: adjust phase information of each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and a switching engine is an LCOS chip. Additionally, the processing module 1501 is configured to: adjust phase information of each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the detected wavelength of each subchannel is a center wavelength, and a switching engine is an MEMS chip. Additionally, the processing module 1501 is configured to: adjust a signal transmission direction corresponding to each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and a switching engine is an MEMS chip. Additionally, the processing module 1501 is configured to: adjust a signal transmission direction corresponding to each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the processing module 1501 is configured to: obtain a fitted frequency offset of each subchannel based on the calibration wavelength of each subchannel or a pixel position of each subchannel, a preset frequency offset fitting formula, and at least one preset group of fitting coefficients, where each group of fitting coefficients includes a group of fitting coefficients of polynomials in the frequency offset fitting formula; calculate a sum of squared errors between the fitted frequency offset of each subchannel and the detected frequency offset of each subchannel; adjust the fitting coefficients of the polynomials in the frequency offset fitting formula, until it is determined that a minimum sum of squared errors between a detected frequency offset of the at least one subchannel and a fitted frequency offset of the at least one subchannel is reached; determine optimal fitting coefficients of the polynomials in the frequency offset fitting formula based on the minimum sum of squared errors; and determine the correspondence between a frequency offset and a wavelength or the correspondence between a frequency offset and a pixel position based on the optimal fitting coefficients.

In yet another possible implementation, the processing module 1501 is configured to: determine a frequency offset expression of each subchannel based on the detected frequency offset of each subchannel, and the calibration wavelength of each subchannel or a pixel position of each subchannel; solve equations of a frequency offset expression of at least one subchannel in the preset channel, to obtain fitting coefficients of polynomials in a frequency offset fitting formula; and determine the correspondence between a frequency offset and a wavelength or the correspondence between a frequency offset and a pixel position based on the fitting coefficients.

The frequency offset processing apparatus provided in this embodiment of this application may perform the frequency offset processing method shown in any one of FIG. 6 to FIG. 14. For an implementation process and beneficial effects thereof, refer to the foregoing description, and details are not described herein again.

Figure 16:
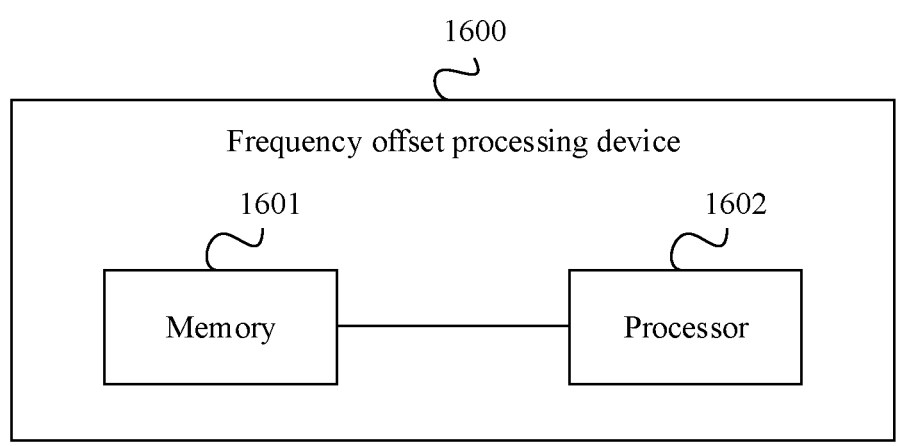
FIG. 16 is a schematic structural diagram of a frequency offset processing device according to an embodiment of this application.

The embodiments of this application may further provide a frequency offset processing device. The frequency offset processing device may perform the frequency offset processing method shown in any one of FIG. 6 to FIG. 14. FIG. 16 is a schematic structural diagram of a frequency offset processing device according to an embodiment of this application. As shown in FIG. 16, the frequency offset processing device 1600 may include a memory 1601 and a processor 1602, where the memory 1601 is coupled to the processor 1602. The memory 1601 is configured to store a computer program, and the processor 1602 is configured to execute the computer program stored in the memory 1601, such that the frequency offset processing device 1600 performs the frequency offset processing method shown in any one of FIG. 6 to FIG. 14.

The processor 1602 is configured to: determine a frequency offset of a preset channel in a WSS, where the preset channel includes at least two channels other than a traffic channel in a plurality of channels; determine a correspondence between a frequency offset and a wavelength or a correspondence between a frequency offset and a pixel position based on the frequency offset of the preset channel; and determine a frequency offset of the traffic channel according to the correspondence between a frequency offset and a wavelength or the correspondence between a frequency offset and a pixel position In a possible implementation, the frequency offset of the preset channel includes detected frequency offsets of a plurality of subchannels in the preset channel, and each subchannel includes at least one pixel column.

In another possible implementation, the processor 1602 is configured to: determine a detected wavelength of each subchannel in the preset channel; determine a calibration wavelength of each subchannel in the preset channel according to a preset correspondence between a subchannel and a wavelength; and determine a detected frequency offset of each subchannel based on the detected wavelength of each subchannel and the calibration wavelength of each subchannel.

In still another possible implementation, the detected wavelength of each subchannel is a center wavelength, and a switching engine is an LCOS chip. Additionally, the processor 1602 is configured to: adjust phase information of each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and a switching engine is an LCOS chip. Additionally, the processor 1602 is configured to: adjust phase information of each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the detected wavelength of each subchannel is a center wavelength, and a switching engine is an MEMS chip. Additionally, the processor 1602 is configured to: adjust a signal transmission direction corresponding to each subchannel, such that a signal reflected by each subchannel is output to an output port of the WSS in a time division manner; adjust a center wavelength of a calibration light source entering each subchannel; detect a maximum optical power of the output port of the WSS; and determine a center wavelength of each subchannel based on the maximum optical power.

In yet another possible implementation, the detected wavelength of each subchannel is an edge wavelength, and a switching engine is an MEMS chip; and the processor 1602 is configured to: adjust a signal transmission direction corresponding to each subchannel, such that a signal reflected by each subchannel is output to an output port of the WSS in a time division manner; adjust a center wavelength of a calibration light source entering each subchannel; detect a power of the output port of the WSS, to generate a filter spectrum of each subchannel; compare the filter spectrum of each subchannel with a filter spectrum of an adjacent subchannel; and determine a wavelength with a same insertion loss or a wavelength at an intersection of the filter spectra as an edge wavelength of each subchannel.

In yet another possible implementation, the processor 1602 is configured to: obtain a fitted frequency offset of each subchannel based on the calibration wavelength of each subchannel or a pixel position of each subchannel, a preset frequency offset fitting formula, and at least one preset group of fitting coefficients, where each group of fitting coefficients includes a group of fitting coefficients of polynomials in the frequency offset fitting formula; calculate a sum of squared errors between the fitted frequency offset of each subchannel and the detected frequency offset of each subchannel; adjust the fitting coefficients of the polynomials in the frequency offset fitting formula, until it is determined that a minimum sum of squared errors between a detected frequency offset of the at least one subchannel and a fitted frequency offset of the at least one subchannel is reached; determine optimal fitting coefficients of the polynomials in the frequency offset fitting formula based on the minimum sum of squared errors; and determine the correspondence between a frequency offset and a wavelength or the correspondence between a frequency offset and a pixel position based on the optimal fitting coefficients.

In yet another possible implementation, the processor 1602 is configured to: determine a frequency offset expression of each subchannel based on the detected frequency offset of each subchannel, and the calibration wavelength of each subchannel or a pixel position of each subchannel; solve equations of a frequency offset expression of at least one subchannel in the preset channel, to obtain fitting coefficients of polynomials in a frequency offset fitting formula; and determine the correspondence between a frequency offset and a wavelength or the correspondence between a frequency offset and a pixel position based on the fitting coefficients.

Optionally, the embodiments of this application may further provide a computer program product. The computer program product includes program code performing the frequency offset processing method shown in any one of FIG. 6 to FIG. 14.

When the computer program product runs on a computer, the computer may be enabled to perform the frequency offset processing method shown in any one of FIG. 6 to FIG. 14.

Optionally, the embodiments of this application may further provide a computer readable storage medium. The storage medium is configured to store a computer program product, and the computer program product includes program code. The program code may include program code that is used to perform the frequency offset processing method shown in any one of FIG. 6 to FIG. 14.

When the computer program product runs on a computer, the computer may be enabled to perform the frequency offset processing method shown in any one of FIG. 6 to FIG. 14.

The computer readable storage medium may be an internal memory in the frequency offset processing device 1600 shown in FIG. 16, or may be an external memory connected to the frequency offset processing device 1600 shown in FIG. 16. The program code in the computer program product may be executed by, for example, the processor 1602 in the frequency offset processing device 1600 shown in FIG. 16.

The frequency offset processing device, the computer program product, and the computer readable storage medium provided in the embodiments of this application may perform the frequency offset processing method shown in any one of FIG. 6 to FIG. 14. For an implementation process and beneficial effects thereof, refer to the foregoing description, and details are not described herein again.

In an example, the frequency offset processing apparatus 1500 shown in FIG. 15 may alternatively be a chip, and the processing module 1501 is a processing kernel (or a processor) of the chip.

In an implementation, the processing kernel of the chip may be configured to: determine a frequency offset of a preset channel in a WSS, where the preset channel includes at least two channels other than a traffic channel among a plurality of channels; determine a correspondence between a frequency offset and a wavelength or a correspondence between a frequency offset and a pixel position based on the frequency offset of the preset channel; and determine a frequency offset of the traffic channel according to the correspondence between a frequency offset and a wavelength or the correspondence between a frequency offset and a pixel position.

Optionally, the processing kernel of the chip may be further configured to perform other functions of the processing module 1501.

The chip provided in this embodiment of this application may also perform the frequency offset processing method shown in any one of FIG. 6 to FIG. 14. For an implementation process and beneficial effects thereof, refer to the foregoing description, and details are not described herein again.

It should be noted that all or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A frequency offset processing method applied to a wavelength selective switch (WSS) comprising a switching engine and a plurality of channels, wherein each channel comprises at least one pixel column of the switching engine, and wherein the frequency offset processing method comprises:
    determining a frequency offset of a preset channel in the WSS, wherein the preset channel comprises at least two channels other than a traffic channel among the plurality of channels;
    determining, based on the frequency offset of the preset channel, a first correspondence between a first frequency offset and a wavelength or a second correspondence between a second frequency offset and a pixel position; and
    determining a frequency offset of the traffic channel according to the first correspondence or the second correspondence.

2. The frequency offset processing method according to claim 1, wherein the preset channel is for frequency offset monitoring and is distributed on two sides of the traffic channel, and wherein a pixel column in the preset channel is located in an edge position in the switching engine.

3. The frequency offset processing method according to claim 1, wherein determining the frequency offset of the preset channel comprises determining detected frequency offsets of a plurality of subchannels in the preset channel, and wherein each subchannel comprises at least one pixel column.

4. The frequency offset processing method according to claim 3, wherein determining the frequency offset of the preset channel in the WSS comprises:
    determining a detected wavelength of each subchannel in the preset channel;
    determining a calibration wavelength of each subchannel in the preset channel according to a preset correspondence between a subchannel and a wavelength; and
    determining a detected frequency offset of each subchannel based on the detected wavelength of each subchannel and the calibration wavelength of each subchannel.

5. The frequency offset processing method according to claim 4, wherein the detected wavelength of each subchannel is a detected center wavelength, wherein the switching engine is a liquid crystal on silicon (LCOS) chip, and wherein determining the detected wavelength of each subchannel in the preset channel comprises:
    adjusting phase information of each subchannel so that a signal reflected by each subchannel is output to an output port of the WSS in a time division manner;
    adjusting a center wavelength of a calibration light source entering each subchannel;
    detecting a maximum optical power of the output port of the WSS; and
    determining the detected center wavelength of each subchannel based on the maximum optical power.

6. The frequency offset processing method according to claim 4, wherein the detected wavelength of each subchannel is an edge wavelength, wherein the switching engine is a liquid crystal on silicon (LCOS) chip, and wherein determining the detected wavelength of each subchannel in the preset channel comprises:

adjusting phase information of each subchannel so that a signal reflected by each subchannel is output to an output port of the WSS in a time division manner;

adjusting a center wavelength of a calibration light source entering each subchannel;

detecting a power of the output port of the WSS to generate a first filter spectrum of each subchannel;

comparing the first filter spectrum of each subchannel with a second filter spectrum of an adjacent subchannel; and determining a wavelength with a same insertion loss or a wavelength at an intersection of the first and second filter spectra as the edge wavelength of each subchannel.

7. The frequency offset processing method according to claim 4, wherein the detected wavelength of each subchannel is a detected center wavelength, wherein the switching engine is a micro-electro-mechanical system (MEMS) chip, and wherein determining the detected wavelength of each subchannel in the preset channel comprises:

adjusting a signal transmission direction corresponding to each subchannel so that a signal reflected by each subchannel is output to an output port of the WSS in a time division manner;

adjusting a center wavelength of a calibration light source entering each subchannel;

detecting a maximum optical power of the output port of the WSS; and determining the detected center wavelength of each subchannel based on the maximum optical power.

8. The frequency offset processing method according to claim 4, wherein the detected wavelength of each subchannel is an edge wavelength, wherein the switching engine is a micro-electro-mechanical system (MEMS) chip, and wherein determining the detected wavelength of each subchannel in the preset channel comprises:

adjusting a signal transmission direction corresponding to each subchannel so that a signal reflected by each subchannel is output to an output port of the WSS in a time division manner;

adjusting a center wavelength of a calibration light source entering each subchannel;

detecting a power of the output port of the WSS to generate a first filter spectrum of each subchannel;

comparing the first filter spectrum of each subchannel with a second filter spectrum of an adjacent subchannel; and determining a wavelength with a same insertion loss or a wavelength at an intersection of the first and second filter spectra as the edge wavelength of each subchannel.

9. The frequency offset processing method according to claim 3, wherein determining the first correspondence or the second correspondence comprises:

obtaining a fitted frequency offset of each subchannel based on a calibration wavelength of each subchannel or a pixel position of each subchannel, a preset frequency offset fitting formula, and at least one preset group of fitting coefficients of polynomials in the preset frequency offset fitting formula;

calculating a sum of squared errors between the fitted frequency offset of each subchannel and the detected frequency offset of each subchannel;

adjusting the fitting coefficients of the polynomials in the frequency offset fitting formula until a minimum sum of squared errors between a detected frequency offset of at least one subchannel and a fitted frequency offset of at least one subchannel is reached;

determining optimal fitting coefficients of monomials in the frequency offset fitting formula based on the minimum sum of squared errors; and determining the first correspondence or the second correspondence based on the optimal fitting coefficients.

10. The frequency offset processing method according to claim 3, wherein determining the first correspondence or the second correspondence comprises:

determining a frequency offset expression of each subchannel based on the detected frequency offset of each subchannel and one of a calibration wavelength of each subchannel or a pixel position of each subchannel;

solving equations of at least one frequency offset expression of at least one subchannel in the preset channel, to obtain fitting coefficients of polynomials in a frequency offset fitting formula; and determining the first correspondence or the second correspondence based on the fitting coefficients.

11. A frequency offset processing device, comprising
one or more processors; and
a storage medium configured to store program instructions that, when executed by the one or more processors, cause the frequency offset processing device to:

determine a frequency offset of a preset channel in a wavelength selective switch (WSS) comprising a switching engine and a plurality of channels, wherein the preset channel comprises at least two channels other than a traffic channel among the plurality of channels;

determine, based on the frequency offset of the preset channel, a first correspondence between a first frequency offset and a wavelength or a second correspondence between a second frequency offset and a pixel position; and determine a frequency offset of the traffic channel according to the first correspondence or the second correspondence.

12. The frequency offset processing device according to claim 11, wherein the frequency offset of the preset channel comprises detected frequency offsets of a plurality of subchannels in the preset channel, and wherein each subchannel comprises at least one pixel column.

13. The frequency offset processing device according to claim 12, wherein when executed by the one or more processors, the program instructions further cause the frequency offset processing device to:

determine a detected wavelength of each subchannel in the preset channel;

determine a calibration wavelength of each subchannel in the preset channel according to a preset correspondence between a subchannel and a wavelength; and determine a detected frequency offset of each subchannel based on the detected wavelength of each subchannel and the calibration wavelength of each subchannel.

14. The frequency offset processing device according to claim 13, wherein the detected wavelength of each subchannel is a detected center wavelength, wherein the switching engine is a liquid crystal on silicon (LCOS) chip, and when executed by the one or more processors, the program instructions further cause the frequency offset processing device to:

adjust phase information of each subchannel so that a signal reflected by each subchannel is output to an output port of the WSS in a time division manner;

adjust a center wavelength of a calibration light source entering each subchannel;

detect a maximum optical power of the output port of the WSS; and determine the detected center wavelength of each subchannel based on the maximum optical power.

15. The frequency offset processing device according to claim 13, wherein the detected wavelength of each subchannel is an edge wavelength, wherein the switching engine is a liquid crystal on silicon (LCOS) chip, and wherein when executed by the one or more processors, the program instructions further cause the frequency offset processing device to:

adjust phase information of each subchannel so that a signal reflected by each subchannel is output to an output port of the WSS in a time division manner;

adjust a center wavelength of a calibration light source entering each subchannel;

detect a power of the output port of the WSS, to generate a first filter spectrum of each subchannel;

compare the first filter spectrum of each subchannel with a second filter spectrum of an adjacent subchannel; and determine a wavelength with a same insertion loss or a wavelength at an intersection of the first and second filter spectra as the edge wavelength of each subchannel.

16. The frequency offset processing device according to claim 13, wherein the detected wavelength of each subchannel is a detected center wavelength, wherein the switching engine is a micro-electro-mechanical system (MEMS) chip, and wherein when executed by the one or more processors, the program instructions further cause the frequency offset processing device to:

adjust a signal transmission direction corresponding to each subchannel so that a signal reflected by each subchannel is output to an output port of the WSS in a time division manner;

adjust a center wavelength of a calibration light source entering each subchannel;

detect a maximum optical power of the output port of the WSS; and determine the detected center wavelength of each subchannel based on the maximum optical power.

17. The frequency offset processing device according to claim 13, wherein the detected wavelength of each subchannel is an edge wavelength, wherein the switching engine is a micro-electro-mechanical system (MEMS) chip, and wherein when executed by the one or more processors, the program instructions further cause the frequency offset processing device to:

adjust a signal transmission direction corresponding to each subchannel so that a signal reflected by each subchannel is output to an output port of the WSS in a time division manner;

adjust a center wavelength of a calibration light source entering each subchannel;

detect a power of the output port of the WSS to generate a first filter spectrum of each subchannel;

compare the first filter spectrum of each subchannel with a second filter spectrum of an adjacent subchannel; and determine a wavelength with a same insertion loss or a wavelength at an intersection of the first and second filter spectra as the edge wavelength of each subchannel.

18. The frequency offset processing device according to claim 12, wherein when executed by the one or more processors, the program instructions further cause the frequency offset processing device to:

obtain a fitted frequency offset of each subchannel based on a calibration wavelength of each subchannel or a pixel position of each subchannel, a preset frequency offset fitting formula, and at least one preset group of fitting coefficients of polynomials in the preset frequency offset fitting formula;

calculate a sum of squared errors between the fitted frequency offset of each subchannel and the detected frequency offset of each subchannel;

adjust the fitting coefficients of the polynomials in the frequency offset fitting formula until a minimum sum of squared errors between a detected frequency offset of at least one subchannel and a fitted frequency offset of at least one subchannel is reached;

determine optimal fitting coefficients of the polynomials in the frequency offset fitting formula based on the minimum sum of squared errors; and determine the first correspondence or the second correspondence based on the optimal fitting coefficients.

19. The frequency offset processing device according to claim 12, wherein when executed by the one or more processors, the program instructions further cause the frequency offset processing device to:

determine a frequency offset expression of each subchannel based on the detected frequency offset of each subchannel and one of a calibration wavelength of each subchannel or a pixel position of each subchannel;

solve equations of at least one frequency offset expression of at least one subchannel in the preset channel to obtain fitting coefficients of polynomials in a frequency offset fitting formula;

and determine the first correspondence or the second correspondence based on the fitting coefficients.

20. A non-transitory computer-readable storage device storing program instructions that, when executed by a processor, cause a frequency offset processing device to:

determine a frequency offset of a preset channel in a wavelength selective switch (WSS) comprising a switching engine and a plurality of channels, wherein the preset channel comprises at least two channels other than a traffic channel among the plurality of channels;

determine, based on the frequency offset of the preset channel, a first correspondence between a first frequency offset and a wavelength or a second correspondence between a second frequency offset and a pixel position; and determine a frequency offset of the traffic channel according to the first correspondence or the second correspondence.

* * * * *